US010484350B2

(12) United States Patent
Kanza

(10) Patent No.: US 10,484,350 B2
(45) Date of Patent: Nov. 19, 2019

(54) PRIVACY-PRESERVING LOCATION CORROBORATIONS

(71) Applicant: AT&T Intellectual Property I, L.P., Atlanta, GA (US)

(72) Inventor: Yaron Kanza, Fair Lawn, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 87 days.

(21) Appl. No.: 15/497,652

(22) Filed: Apr. 26, 2017

(65) Prior Publication Data

US 2018/0316653 A1  Nov. 1, 2018

(51) Int. Cl.
*H04L 29/06* (2006.01)
*H04L 9/32* (2006.01)
(Continued)

(52) U.S. Cl.
CPC ........ *H04L 63/0492* (2013.01); *H04L 9/3239* (2013.01); *H04L 9/3247* (2013.01); *H04L 9/3297* (2013.01); *H04L 63/0442* (2013.01); *H04L 63/0861* (2013.01); *H04L 63/0876* (2013.01); *H04L 63/123* (2013.01); *H04W 12/00503* (2019.01);
(Continued)

(58) Field of Classification Search
CPC ............. H04L 63/0492; H04L 63/0442; H04L 63/0861; H04L 63/0876; H04L 63/123; H04L 9/3242
USPC ........................................................ 713/181
See application file for complete search history.

(56) References Cited

U.S. PATENT DOCUMENTS 5,266,944 A   11/1993  Carroll et al.
5,396,227 A    3/1995  Carroll et al.
(Continued)

FOREIGN PATENT DOCUMENTS

EP   1825430   4/2006
EP   2757533   7/2014
(Continued)

OTHER PUBLICATIONS

Reddy et al., "Forensic Analysis of Electronic Systems: A Comprehensive Methodology," International Journal of Electronics and Communication Engineering, vol. 5, No. 3 (2012), pp. 311-318, International Research Publication House.

(Continued)

*Primary Examiner* — Jahangir Kabir
(74) *Attorney, Agent, or Firm* — Hartman & Citrin LLC

(57) ABSTRACT

Concepts and technologies disclosed herein are directed to privacy-preserving location corroborations. According to one aspect, a localized corroborator system can receive a message digest from a user device. The message digest can be generated by the user device using a cryptographic hash function based upon bitwise XOR of a user identifier and a location proof identifier. The location proof identifier can uniquely identify a location proof to be created by the system. The system can concatenate a corroborator identifier, a location, a time, and the message digest to create a concatenated message. The system can sign the concatenate message using a private key to create the location proof and can send the corroborator identifier and the location proof to the user device. The user device can use the location proof to prove that the user was located at the location at the time.

20 Claims, 14 Drawing Sheets

(51) Int. Cl.
*H04W 12/00* (2009.01)
*H04W 12/10* (2009.01)

(52) U.S. Cl.
CPC ............. *H04W 12/00512* (2019.01); *H04W 12/00514* (2019.01); *H04W 12/1004* (2019.01)

(56) References Cited

U.S. PATENT DOCUMENTS

| | | | |
|---|---|---|---|
| 5,784,464 A * | 7/1998 | Akiyama | G06F 21/10 |
| | | | 348/E5.004 |
| 6,091,956 A | 7/2000 | Hollenberg | |
| 6,697,103 B1 | 2/2004 | Fernandez et al. | |
| 6,954,861 B2 * | 10/2005 | Watkins | H04L 63/0807 |
| | | | 705/56 |
| 7,533,331 B2 * | 5/2009 | Brown | H04L 1/0083 |
| | | | 713/176 |
| 7,830,962 B1 | 11/2010 | Fernandez et al. | |
| 8,085,191 B2 | 12/2011 | Green | |
| 8,150,967 B2 | 4/2012 | King et al. | |
| 8,730,062 B2 | 5/2014 | Eldershaw et al. | |
| 8,826,015 B2 * | 9/2014 | Lakshminarayanan | |
| | | | G06F 21/445 |
| | | | 380/278 |
| 8,981,995 B2 | 3/2015 | Schlesinger et al. | |
| 9,107,085 B1 | 8/2015 | Wu | |
| 9,113,431 B2 | 8/2015 | Gao et al. | |
| 9,253,452 B2 | 2/2016 | Ross et al. | |
| 2003/0204734 A1 | 10/2003 | Wheeler | H04L 9/0844 |
| | | | 713/184 |
| 2004/0098585 A1 * | 5/2004 | Grove | G06F 21/31 |
| | | | 713/168 |
| 2005/0166263 A1 * | 7/2005 | Nanopoulos | G06F 21/31 |
| | | | 726/7 |
| 2008/0019527 A1 * | 1/2008 | Youn | H04L 9/083 |
| | | | 380/278 |
| 2008/0044014 A1 * | 2/2008 | Corndorf | H04L 63/12 |
| | | | 380/37 |
| 2009/0177626 A1 | 7/2009 | Lottero | |
| 2011/0055906 A1 * | 3/2011 | Rozek | G06F 21/31 |
| | | | 726/4 |
| 2011/0164749 A1 * | 7/2011 | Natarajan | H04W 12/06 |
| | | | 380/270 |
| 2013/0054961 A1 * | 2/2013 | Kato | H04L 9/0869 |
| | | | 713/155 |
| 2014/0123249 A1 | 5/2014 | Davis et al. | |
| 2014/0129127 A1 | 5/2014 | Kane et al. | |
| 2014/0173110 A1 * | 6/2014 | Uetabira | H04W 12/08 |
| | | | 709/225 |
| 2014/0304505 A1 * | 10/2014 | Dawson | G06F 21/6227 |
| | | | 713/165 |
| 2015/0047007 A1 * | 2/2015 | Colnot | H04L 9/3271 |
| | | | 726/7 |
| 2015/0149766 A1 * | 5/2015 | Shukla | H04L 9/3247 |
| | | | 713/155 |
| 2016/0223278 A1 | 8/2016 | Schechter | |
| 2016/0371968 A1 | 12/2016 | Almansour | |

FOREIGN PATENT DOCUMENTS

| | | |
|---|---|---|
| FR | 2827693 | 1/2003 |
| FR | 2872917 | 9/2007 |
| GB | 2375921 | 11/2002 |
| GB | 2388493 | 11/2003 |
| WO | WO 2016/142225 | 9/2016 |

OTHER PUBLICATIONS

Iqbal et al., "A Privacy Preserving GPS-based Pay-as-You-Drive Insurance Scheme," International Global Navigation Satellite Systems Society, IGNSS Symposium 2006, Jul. 17-21, 2006.

Mylonas et al., "Smartphone sensor data as digital evidence," Computers & Security 38 (2013), Mar. 16, 2013, pp. 51-75, 2013 Elsevier Ltd.

Renzema et al., "Can electronic monitoring reduce crime for moderate to high-risk offenders?" Journal of Experimental Criminology (2005), vol. 1, Issue 2, Jul. 2005, pp. 215-237, Springer 2005.

Cheng et al., "A Collaborative Privacy-Enhanced Alibi Phone," International Conference on Grid and Pervasive Computing, May 3-5, 2006, pp. 405-414, Springer Berlin Heidelberg 2006.

Kanza, "Location Corroboration by Mobile Devices Without Traces," Proceeding GIS '16 Proceedings of the 24th ACM SIGSPATIAL International Conference on Advances in Geographic Information Systems Article No. 60, Oct. 2016.

* cited by examiner

PRIVACY-PRESERVING LOCATION CORROBORATIONS

BACKGROUND

The legal concept of an alibi is the plea of having been, at the time of commission of an act, elsewhere than at the place of commission of the act. Traditionally, human witnesses are relied upon to testify that a person was seen at a certain location at a given time. Reliance upon human witnesses, however, is often problematic. This is because witnesses are not always available. A witness might be considered unreliable because he or she might not have a vivid memory of the person who needs the alibi. The reliability of a witness might also be brought into question due to his or her prior relationships with that person and any resultant bias. Another reason reliance upon human witnesses is problematic is because a witness might not be willing to provide an alibi unless forced to do so by court order, especially in small personal disputes. Yet, even when there is human testimony for the presence of someone at some location, evidence independent of this testimony could strengthen an alibi.

In some cases, including those described above, it would be beneficial for people to have access to a system that can provide a location corroboration. Since people often carry a smartphone or other device with location-determining capabilities, it might be effective to use such device(s) as a tool to provide location corroborations. A location corroboration should be reliable such that a user could not fake location data. Moreover, to protect user privacy, the location of the user should not be revealed to anyone, unless necessary as part of a location proof procedure. Reliability is not a simple task because users can easily fake global positioning system ("GPS") readings provided by smartphones. For this reason, a simple method that merely records the GPS location of a smartphone for which a location corroboration is desired is unreliable. Adding to the complexity of any location corroboration scheme is maintaining private the location of the user.

SUMMARY

Concepts and technologies disclosed herein are directed to privacy-preserving location corroborations. According to one aspect of the concepts and technologies disclosed herein, a localized corroborator system can receive a message digest from a user device, such as, for example, a smartphone. The message digest can be generated by the user device using a cryptographic hash function based upon a bitwise XOR of a user identifier and a location proof identifier. The user identifier uniquely identifies a user associated with the user device. The location proof identifier uniquely identifies a location proof to be created by the localized corroborator system. The localized corroborator system can concatenate a corroborator identifier, a location, a time, and the message digest to create a concatenated message. The corroborator identifier uniquely identifies the localized corroboration system. The localized corroborator system can sign the concatenated message using a private key to create the location proof. The localized corroborator system can send the corroborator identifier and the location proof to the user device for use by the user device to prove that the user was located at the location at the time.

In some embodiments, the location proof identifier includes a random number. The random number can have the same number of bits as the user identifier. The user identifier, in some embodiments is based, at least in part, upon a biometric of the user. The user identifier can additionally or alternatively be based upon a device identifier and/or a session identifier. The device identifier can be a media access control ("MAC") address, an international mobile subscriber identity ("IMSI") associated with a subscriber identity module ("SIM") installed in the user device, or an international mobile equipment identity ("IMEI"). The session identifier can uniquely identify a communications session between the user device and the localized corroborator system and can be assigned by the localized corroborator system. In some embodiments, the user identifier includes a hash of a concatenation of the biometric, the device identifier, and the session identifier.

In some embodiments, the localized corroborator system can receive the message digest from the user device via a short range communications technology. In these embodiments, the localized corroborator system can be embodied as a wireless access point capable of operating in accordance with the short range communications technology. In some other embodiments, the localized corroborator system can receive the message digest from the user device via a wireless telecommunications technology. In these embodiments, the localized corroborator system can be embodied as a cell tower capable of operating in accordance with the wireless telecommunications technology.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
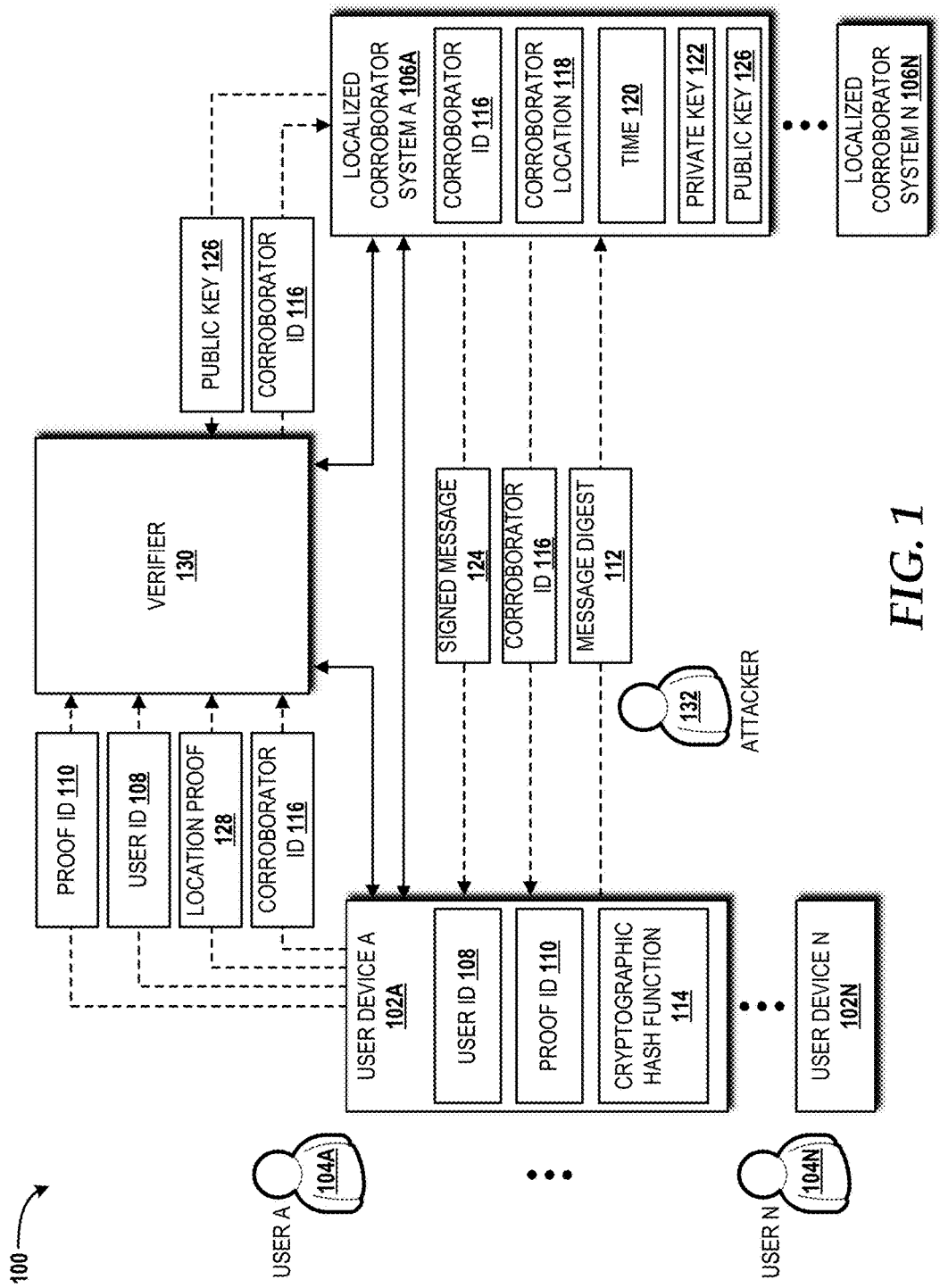
FIG. 1 is a block diagram illustrating an illustrative operating environment capable of implementing aspects of the concepts and technologies disclosed herein.

A person might need to prove where they were at a certain time—for example, in legal proceedings or in personal disputes. Given a time t and a location l, a location corroboration of a user u can be certified evidence that u was at l, at time t. An alibi is a reliable confirmation that u was elsewhere (i.e., not in location l) at time t. In a privacy-preserving location corroboration, the evidence is provided without revealing the location of the user to anyone, except for a verifier of the proof, and with the location obfuscated according to a required level of privacy (e.g., at the granularity of a street, a neighborhood, a city, or the like). In a privacy-preserving alibi, the location is not revealed at all. The concepts and technologies disclosed herein address the problem of how to use devices, such as smartphones, to generate location corroborations without exposing the location of the user to unauthorized entities. Three different location corroboration schemes are disclosed herein. In one location corroboration scheme, location proofs are provided using a localized corroborator. In another location corroboration scheme, corroborations are provided by nearby users via user devices. In yet another location corroboration scheme, an alibi is provided without revealing the user's location, not even to the verifier. These location corroboration schemes and the privacy guarantees provided by each are described in detail herein.

Keeping locations concealed and leaving no location traces that could be later discovered can be explained by the following example scenario. When Bob ("user B") provides to Victor ("verifier") a location corroboration for location l and time t, only Victor is exposed to the information that at time t Bob was at l. When Alice ("user A") provides to Victor an alibi for location l and time t, neither Victor nor anyone else should know where Alice was at time t. Victor should only know that Alice was in a place different from l. In addition, visited locations of Alice and Bob should not be stored in any public component of the system.

To allow users control of their privacy, it should be possible to provide location corroborations and alibis in an obfuscated manner (e.g., at a granularity of a neighborhood, a city, or the like). That is, a user might provide proof that he or she was in a certain city at a given time, without revealing where exactly he or she was in the city. Similarly, a user might provide an alibi for not being in a certain neighborhood at a given time, referring to the entire area of the neighborhood and not just to a specific location within the neighborhood.

Traces can reveal a user's private information, such as a user's home location and even the identity of the user. In an effort to protect user privacy, it is imperative that user location data could not be inferred from the information stored about him or her in public entities. This requires avoiding storage of user identifying information in different places the user has visited or otherwise storing a pseudonym (e.g., fake identifier) with the locations the user has visited. A goal of concepts and technologies disclosed herein is to provide methods for location corroboration that avoid storing any traces in public entities.

The concepts and technologies disclosed herein provide a location corroboration scheme that does not store the user location in any public entity. The concepts and technologies disclosed herein provide an alibi scheme that does not reveal the location of the user to a verifier. The concepts and technologies disclosed herein show how to obfuscate corroborations and alibis to provide varying granularity. The concepts and technologies disclosed herein introduce a scheme in which users receive a corroboration from nearby users without exposing the location of either the provider or the receiver.

The growing popularity and the rising economic importance of location-based services has raised the need for location verification—that is, where a service can verify the truthfulness of provided location claims. Several others have studied this problem and presented methods for users to prove that the reported location is genuine. One such method introduces the concept of a location proof through which users can gain proof from a nearby cell tower or Wi-Fi access point. This method, however, reveals the user identity to the provider of the proof, and thus, does not guarantee privacy to the user.

Leaks of personally identifiable information via online social networks is a severe privacy concern for many social network users. Society has demonstrated how personally-identifiable information can be linked with actions of the user within a social networking application. Moreover, it has been shown that service providers might use personal information of users in unpredictable ways and might even share location information of users with third parties.

The awareness of privacy threats has led to a growing interest in providing location proofs that are privacy-preserving. One known system for creating location proofs for location-based services requires users to use pseudonyms to conceal their identity. The pseudonyms are stored along with the visited locations in a location-proof server. Another server stores the mapping of real user identities to their pseudonyms. Users can then select a pseudonym from a set of pseudonyms according to a Poisson distribution. In this manner, an attacker who sees the information will not be able to easily identify the visited locations. Verification can be made by connecting the information from the two servers. In this approach, the location data in the location-proof server might reveal the identity of the user, even if the identity is concealed by pseudonyms.

Further work using pseudonyms has been ameliorated, sparing the need to trust a third party to register the pseudonyms. This work proposes an architecture in which a pseudonym is registered by the user in a pseudonym-issuing organization, and the user receives a certificate that allows verifiers to validate the authenticity of the pseudonym. This work does not, however, address the privacy breach that may occur when storing visited locations in an external entity.

Still further work has presented a system based on the use of pseudonyms for reporting to social networking applications a verified location. This work shows how the social networking application can use sampling to provide summaries of activities, such as the distance the user traveled, while preserving the privacy of the user.

Other work also deals with the problem of guaranteeing that users would only report valid locations to social-media applications, while protecting the user privacy by relying on trusted third parties. The trusted location is obtained from access points, such as a cell tower, and the user location is separated from the user's identity. A trusted third party for managing location information ("TTPL" component) stores the locations while a trusted third party for managing user information ("TTPU" component) stores the user information. Tokens are used for connecting the location data and the user data. This work does not avoid storing user location data in a public entity (i.e., the TTPL component).

Other work has relied upon BLUETOOTH transmitters to provide to nearby devices time-dependent encryption keys. This work utilizes a system that publishes the traveled trajectories of the users encrypted so that only users who have the key can decrypt their trajectory. One such method allows content producers to tag their content with location and time stamps without exposing the identity of the content producer to content consumers.

Other work allows neighbor users to provide the certification of the location proof. A goal of this work is to detect colluding users, such as, for example, in cases where there is a high spatio-temporal correlation between the receiver of the proof and the provider of the proof.

A location proof scheme also has been described. This location proof scheme relies on neighbor users with a goal to allow proof owners to contact human witnesses who could appear before a judge in court. In this scheme, the identity of the corroborator is concealed and is revealed only when the corroborator agrees to provide the testimony about the location of the proof owner. It should be noted that in the proof verification process both the location and the identity of the corroborator are exposed.

The concepts and technologies disclosed herein are different in several aspects from the works described above. According to one aspect disclosed herein, a location corroboration system can function without storage of location information in any public entity or in devices of users, other than the device of the proof owner. According to another aspect, a system can provide an alibi scheme that does not reveal the actual location of the user, which is novel in view of the aforementioned works. Yet another aspect disclosed herein is the ability to provide a corroboration and an alibi at different levels of obfuscation. According to yet another aspect, the location of the users who provide the corroboration can be concealed.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for privacy-preserving location corroborations will be described.

Turning now to FIG. 1, an operating environment 100 in which aspects of the concepts and technologies disclosed herein can be implemented will be described, according to an embodiment. The illustrated operating environment 100 includes user devices 102A-102N (hereinafter, at times, collectively referred to as "user devices 102" or in the singular as "user device 102") associated with users 104A-104N (hereinafter, at times, collectively referred to as "users 104" or in the singular as "user 104") whose location is to be corroborated via one or more localized corroborator systems 106A-106N (hereinafter, at times, collectively referred to as "localized corroborator systems 106" or in the singular as "localized corroborator system 106").

Each of the user devices 102 can be or can include a smartphone, a mobile computing device, a tablet computing device, a portable video game console, or any other device associated with one or more of the users 104. Each of the localized corroborator systems 106 can be or can include a server that has a known location and that can only be accessed by the user devices 102 within a specific range—referred to herein as a "local range." In some embodiments, one or more of the localized corroborator systems 106 can be or can include a cell tower, including, for example, one or more base stations such as one or more eNode-Bs operating in accordance with one or more wireless telecommunications technologies, examples of which are described herein below with reference to FIG. 14. In some other embodiments, one or more of the localized corroborator systems 106 can be or can include a wireless access point operating in accordance with a short-range wireless communications technology such as, but not limited to, IEEE 802.11x WI-FI, BLUETOOTH, ZIGBEE, and/or the like. In some embodiments, one or more of the localized corroborator systems 106 can be or can include an optical access point that utilizes an optical communications technology such as, for example, infrared or other line of sight optical technology.

When the user device 102 is connected to the localized corroborator system 106, the user 104 is determined to be near (i.e., within the local range) the known location of the localized corroborator system 106. For embodiments in which the localized corroborator system 106 is or includes a BLUETOOTH, ZIGBEE, or infrared access point, the local range within which the user device 102 and the localized corroborator system 106 can be connected is within a few meters. For embodiments in which the localized corroborator system 106 is or includes a WI-FI access point, the local range within which the user device 102 and the localized corroborator system 106 can be connected is within tens of meters. For embodiments in which the localized corroborator system 106 is or includes a cell tower, the local range within which the user device 102 and the localized corroborator system 106 can be connected is within a few miles. In other words, the local range is dependent upon the technology utilized by the localized corroborator system 106. As such, the local range is not limited to the specific examples mentioned above. The remaining elements of FIG. 1 will be described in context of other methods and location corroboration scheme diagrams disclosed herein. Moreover, elements of FIG. 1 will be referenced throughout the remainder of this description.

Figure 2:
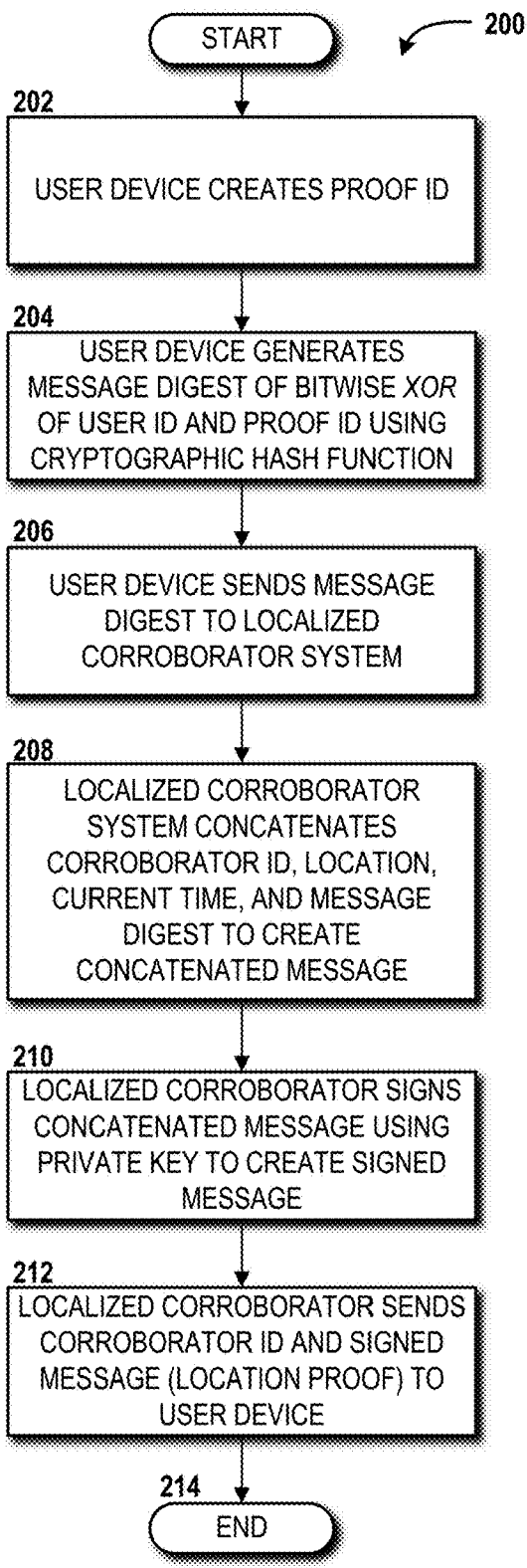
FIG. 2 is a flow diagram illustrating aspects of a method for creating a location proof in accordance with an illustrative location corroboration scheme using a localized corroborator, according to an embodiment.

Turning now to FIG. 2, a method 200 for creating a location proof in accordance with an illustrative location corroboration scheme using a localized corroborator, such as the localized corroborator system 106, will be described, according to an exemplary embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the methods disclosed herein may be described as being performed, at least in part, by one of the processors via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and additional reference to FIGS. 1 and 3. Moreover, the method 200 will be described under the assumption that the user 104 is associated with a user ID 108 that uniquely identifies the user 104 from other users 104. In some embodiments, the user ID 108 is generated based upon a biometric recognition method, such as, but not limited to, fingerprint, voice, face, or iris recognition. Alternatively, the user ID 108 can be selected by the user 104, a service provider associated with a service (e.g., cellular service) utilized by the user device 102, or some other entity.

The method 200 begins and proceeds to operation 202, where the user device 102 creates a proof ID 110 (represented in FIG. 3 as $p_{id}$) used to uniquely identify a location proof to be created. In some embodiments, the proof ID 110 is a random number with the same number of bits as the user ID 108 (represented in FIG. 3 as $u_{id}$). The proof ID 110 is used as a cryptographic nonce for the creation of the location proof. As such, the proof ID 110 uniquely identifies the location proof.

Figure 3:
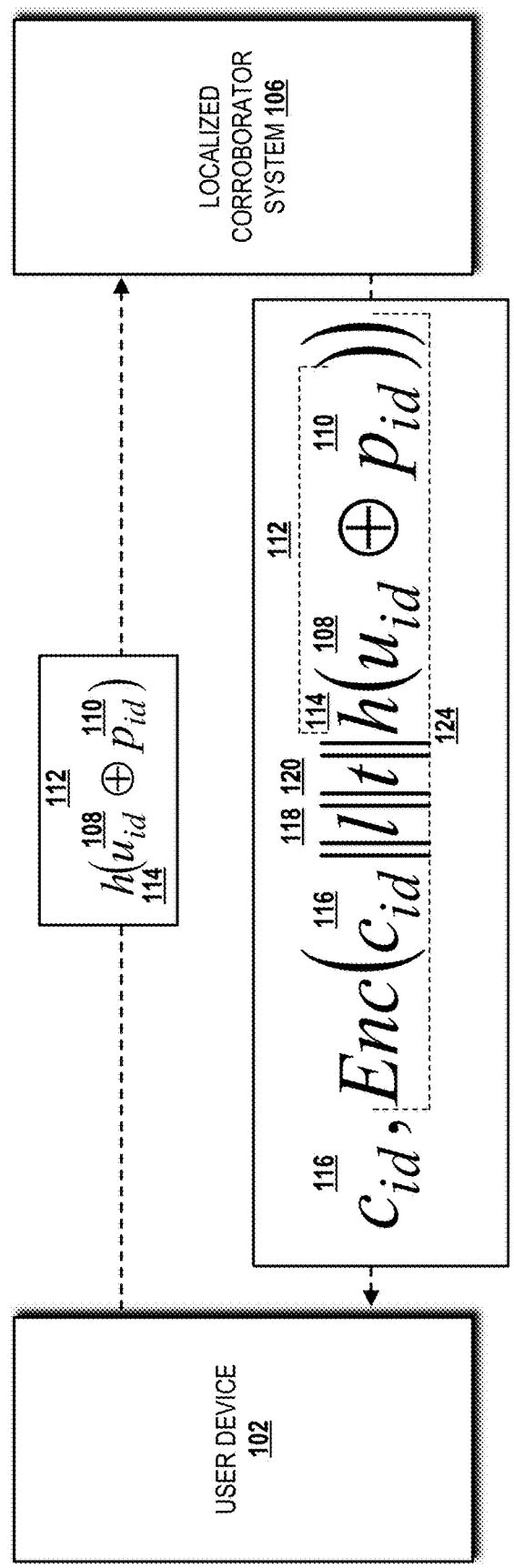
FIG. 3 is a diagram illustrating a location corroboration scheme using a localized corroborator, according to an embodiment.

From operation 202, the method 200 proceeds to operation 204, where the user device 102 generates a message digest 112 of a bitwise XOR of the user ID 108 and the proof ID 110 using a cryptographic hash function 114 (represented in FIG. 3 as h), thereby producing $h(u_{id} \oplus p_{id})$ as shown in FIG. 3. The cryptographic hash function 114 is a hash function that maps an arbitrary string of any length to a sequence of a fixed number of bits. For the location proof, the arbitrary string is a message that includes the user ID 108 and the proof ID 110, and the sequence is the message digest 112, such that when given h(x) for any arbitrary message x, it is infeasible to invert the computation to reveal x. Moreover, given h(x) and x, it is infeasible to find y≠x such that h(x)=h(y). The cryptographic hash function 114, in some embodiments, is implemented using the MD5 algorithm. It is contemplated that the cryptographic hash function 114 can be implemented using other algorithms known to those skilled in the art. By way of example, and not limitation, the cryptographic hash function 114 can be implemented using SHA-2, SHA-3, and future versions of these and other cryptographic hash functions. The bitwise XOR $s_1 \oplus s_2$ of two sequences of n bits, $s_1 = b_{11} \ldots b_{1n}$ and $s_2 = b_{21} \ldots b_{2n}$, is the sequence $b_{11} \oplus b_{21} \ldots b_{1n} \oplus b_{2n}$, where bit i in the result is the XOR of bit i of $s_1$ and bit i of $s_2$.

From operation 204, the method 200 proceeds to operation 206, where the user device 102 sends the message digest 112 to the localized corroborator system 106. From operation 206, the method 200 proceeds to operation 208, where the localized corroborator system 106 concatenates the message digest 112, a corroborator ID 116 (represented as $c_{id}$ in FIG. 3), a corroborator location 118 (represented as l in FIG. 3), and a current time 120 (represented as t in FIG. 3) to create a concatenated message. From operation 208, the method 200 proceeds to operation 210, where the localized corroborator system 106 signs the concatenated message using a private key 122. From operation 210, the method 200 proceeds to operation 212, where the localized corroborator system 106 sends the corroborator ID 116 and the signed concatenated message (illustrated in FIGS. 1 and 3 as "signed message") 124 to the user device 102. From operation 212, the method 200 proceeds to operation 214. The method 200 ends at operation 214.

In the illustrated embodiment, the localized corroborator system 106 utilizes a public-key cryptographic system, including a public key 126 (known to all) and a private key 122 (known only to the localized corroborator system 106). A message encrypted using the public key 126 only can be decrypted by the holder of the private key 122 (the localized corroborator system 106 in this example). For authentication, only the key holder can encrypt a message, using the private key 122, and any user with the public key 126 can decrypt the message, knowing that the message has been generated by the holder of the private key 122. In some embodiments, the public-key cryptosystem utilized by the localized corroborator system 106 is RSA, although other public-key cryptosystems are contemplated.

Figure 4:
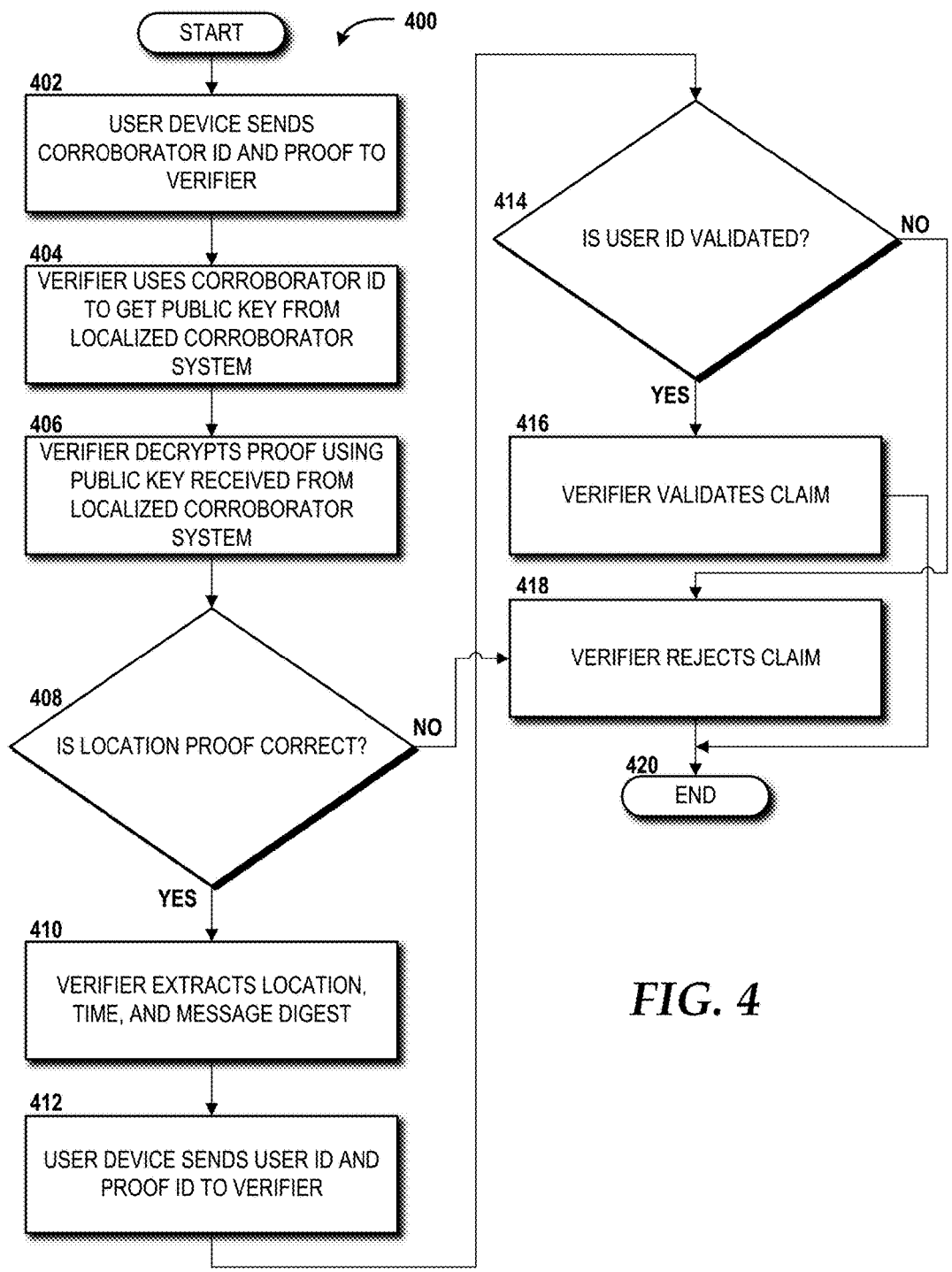
FIG. 4 is a flow diagram illustrating aspects of a method for verifying a location of a user, according to an embodiment.

Turning now to FIG. 4, a method 400 for verifying a location of the user 104 will be described, according to an illustrative embodiment. The method 400 will be described with reference to FIG. 4 and further reference to FIG. 1. The method 400 begins and proceeds to operation 402, where the user device 102 sends the corroborator ID 116 and a location proof P 128 (i.e., the signed message 124) to a verifier 130 to prove the location of the user 104 to the verifier 130 (i.e., within a local range of the corroborator location 118). From operation 402, the method 400 proceeds to operation 404, where the verifier 130 uses the corroborator ID 116 to get the public key 126 from the localized corroborator system 106.

From operation 404, the method 400 proceeds to operation 406, where the verifier 130 decrypts the location proof 128 using the public key 126 received from the localized corroborator system 106. From operation 406, the method 400 proceeds to operation 408, where the verifier 130 determines whether the location proof 128 is correct—that is, the verifier 130 determines whether $Dec(P)=(c_{id}, 1, t, m_{digest})$. If so, the method 400 proceeds to operation 410, where the verifier 130 extracts the corroborator location (l) 110, the time (t) 120, and the message digest ($m_{digest}$) 112.

From operation 410, the method 400 proceeds to operation 412, where the user device 102 sends the user ID 108 and the proof ID 110 to the verifier 130. From operation 412, the method 400 proceeds to operation 414, where the verifier 130 determines whether the user 104 is validated by verifying that, when applying the function h on the XOR of $u_{id}$ and $p_{id}$, holds that $h(u_{id} \oplus p_{id})=m_{digest}$. If so, the method 400 proceeds to operation 416, where the verifier 130 validates the claim that the user 104 was indeed at a certain location (i.e., within a local range of the corroborator location 118) at a certain time (i.e., the time 120). If not, the method 400 proceeds to operation 418, where the verifier 130 rejects this claim. From operation 416 or operation 418, the method 400 proceeds to operation 420, where the method 400 ends. Turning back to operation 408, if the location proof 128 is determined to be incorrect, the method 400 proceeds to operation 418.

The aforementioned methodologies 200, 400 maintain privacy of the user 104 by not revealing the user's location. To explain some privacy aspects of the methodologies 200, 400, three illustrative attack cases are now described with reference to FIG. 1.

In a first illustrative attack case, an attacker 132 might see the message digest ($m_{digest}$) 112. Even if the attacker 132 finds x such that $h(x)=m_{digest}$, without knowing the proof ID $p_{id}$ 110, not even a single bit of the user ID 108 is revealed to the attacker 132. If the attacker 132 tries to perform a pre-image attack, even when knowing the proof ID $p_{id}$ 110 and the cryptographic hash function h 114, it is infeasible for the attacker 132 to find a value x such that $h(u_{id} \oplus x)=h(u_{id} \oplus p_{id})$. Furthermore, even if such value is discovered by the attacker 132, there might still be a different user id $u'_{id}$ such that $h(u'_{id} \oplus x)=h(u_{id} \oplus p_{id})$. This is because the cryptographic hash function h 114 might map two different messages to the same message digest.

In a second illustrative attack case, the attacker 132 might see the location proof P 128. This is similar to the first case described above because it is infeasible to associate the extracted message digest ($m_{digest}$) 112 with a specific user after the XOR of the user ID 108 with the proof ID 110.

A third illustrative attack case is when the attacker 132 sees many location proofs from one or more of the localized corroborator systems 106. In each of these location proofs, the value of $h(u_{id} \oplus p_{id})$ is unique. This is because the value is generated by digesting a completely different message. Thus, there is no way to associate location proofs of the same user to one another. This prevents the attacker 132 from knowing who the user 104 is based on the places the user 104 frequently visits and/or based upon traces.

The aforementioned methodologies 200, 400 are also reliable in that the user 104 cannot fake a location proof. Since $Enc(c_{id}\|l\|t\|h(u_{id}\oplus p_{id}))$ is encrypted using the private key 122 of the localized corroborator system 106, the user 104 cannot generate the private key 122 without breaking the public-key cryptographic system. Even if the user (u) 104 receives, from some other user (u'; e.g., user N 104N), the location proof $Enc(c_{id}\|l\|t\|h(u'_{id}\oplus p_{id}))$ 128 and the value of the proof ID $p_{id}$ 110, it would still be impractical for the user 104 to find a value x such that $h(u_{id} \oplus x)=h(u'_{id}\oplus p_{id})$. Thus, the user 104 (e.g., the user A 104A) cannot use a location proof that was created with the user ID 108 of another user (e.g., the user N 104N).

Figure 5:
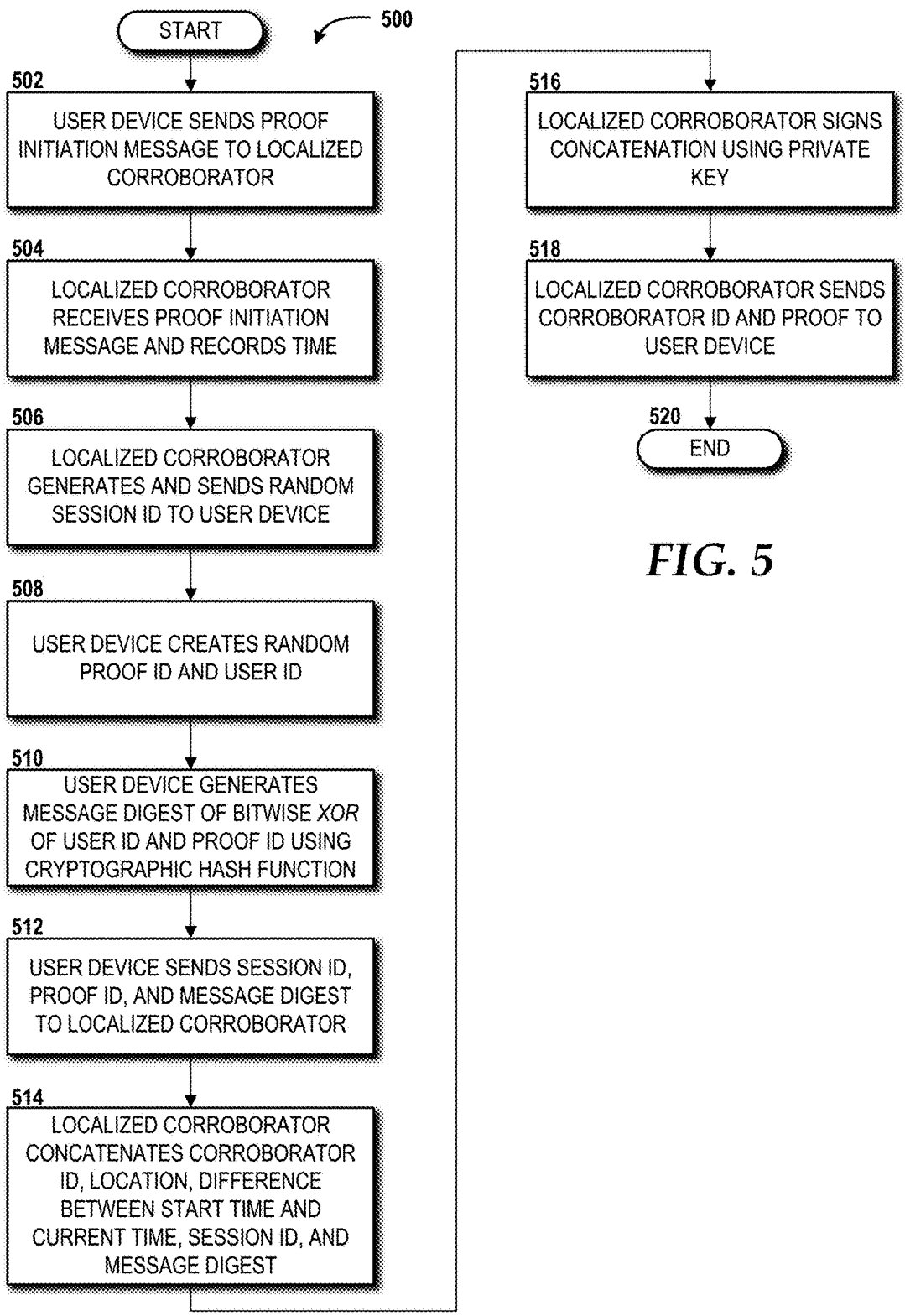
FIG. 5 is a flow diagram illustrating aspects of a method for creating a location proof that mitigates tunneling, according to an embodiment.
Figure 6:
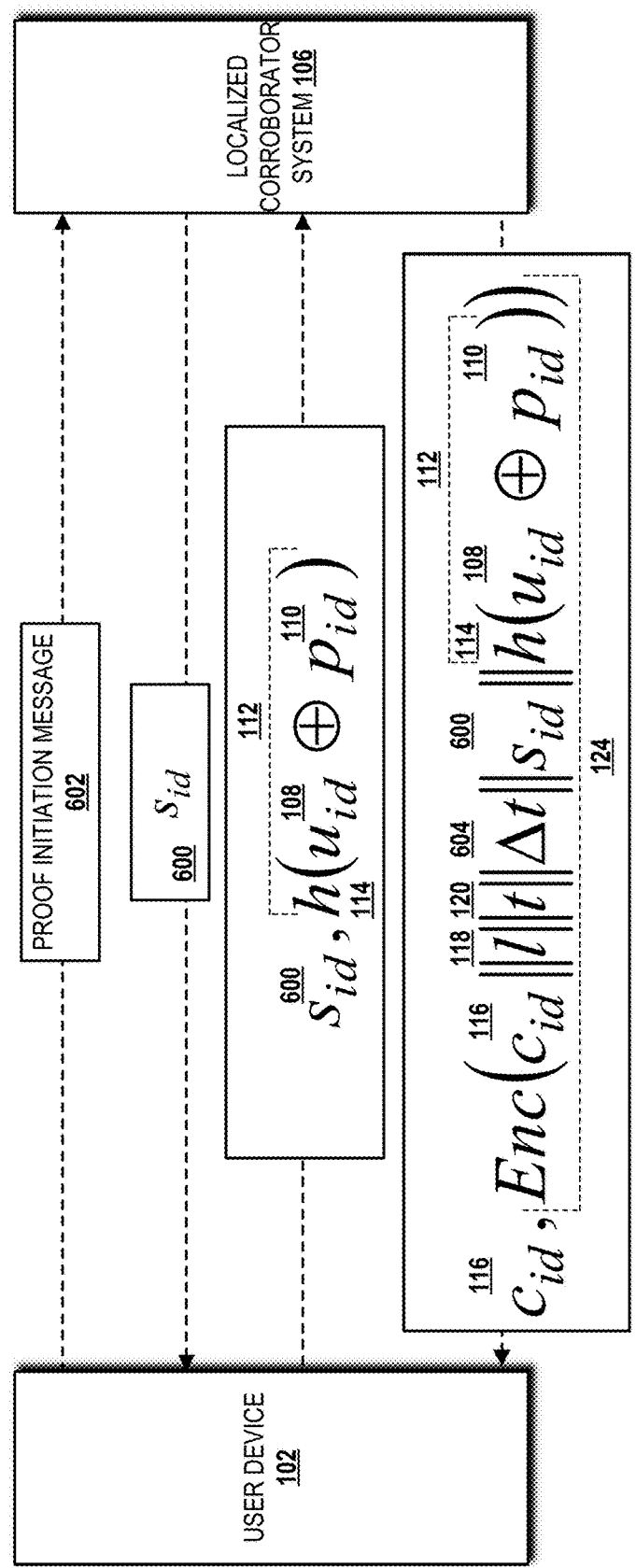
FIG. 6 is a diagram illustrating a location corroboration scheme using a localized corroborator that mitigates tunneling, according to an embodiment.

Turning now to FIG. 5, a method 500 for creating a location proof that mitigates tunneling will be described, according to an illustrative embodiment. The method 500 will be described with reference to FIG. 5 and further reference to FIG. 1 and FIG. 6. As used herein, "tunneling" can be performed when the user 104 and another entity, such as another user (e.g., the user N 104N) or a remote proxy (not shown) work together to generate a false location proof. For example, if the user ID 108 is just a static number, it might be given to another user or transmitted to the remote proxy, which will generate a false location proof on behalf of the user 104. The act of transmitting the user ID 108 over a network (such as the network best shown in FIG. 14) can expose an attempt to mislead the proof creation system. Thus, for many practical applications, it might be sufficient to prevent the user device 102 from making long distance connections during the short time needed to produce a location proof.

To prevent misuse of the user ID 108 by more sophisticated attackers (e.g., the attacker 132), the user ID 108 can be generated uniquely per proof by a user ID generator (not shown) that is embedded in the user device 102. In some embodiments, the user ID 108 is created from three values. The user ID 108 can be created, in part, from a biometric user ID ($u_b$), generated from biometric input as described above. The user ID 108 can be created, in part, from a device ID ($d_{id}$). The device ID can be or can include a media access control ("MAC") address of the user device 102, an international mobile subscriber identity ("IMSI") associated with a subscriber identity module ("SIM") of the user device 102, and/or an international mobile equipment identity ("IMEI"). The user ID 108 can be created, in part, from a session ID ($s_{id}$) 600 (best shown in FIG. 6) received from the localized corroborator system 106. The user ID 108 can be created as a message digest $u_{id}=h(u_b\|d_{id}\|s_{id})$, using the public cryptographic hash function h 114. A verifier, such as the verifier 130 shown in FIG. 1, who is given the values $u_b$, $d_{id}$, $s_{id}$, and $h(u_b\|d_{id}\|s_{id})$ can test the validity of $u_b$, $d_{id}$, $s_{id}$ by applying h on the concatenation of these IDs.

The method 500 will now be described. The method 500 begin and proceeds to operation 502, where the user device 102 sends a proof initiation message 602 (shown in FIG. 6) to the localized corroborator system 106. From operation 502, the method 500 proceeds to operation 504, where the localized corroborator system 106 receives the proof initiation message 602 from the user device 102 and records the time 120. From operation 504, the method 500 proceeds to operation 506, where the localized corroborator system 106 generates the session ID $s_{id}$ 600 to be used for this communications session and sends the session ID $s_{id}$ 600 to the user device 102 in response to the proof initiation message 602.

From operation 506, the method 500 proceeds to operation 508, where the user device 102 creates the proof ID $p_{id}$ 110 and the user ID $u_{id}$ 108. As explained above, the user ID 108 can be created as a message digest $u_{id}=h(u_b\|d_{id}\|s_{id})$, using the public cryptographic hash function h 114. From operation 508, the method 500 proceeds to operation 510, where user device 102 generates the message digest 112 of a bitwise XOR of the user ID 108 and the proof ID 110 using the cryptographic hash function 114. From operation 510, the method 500 proceeds to operation 512, where the user device 102 sends the session ID 600, the proof ID 110, and the message digest 112 to the localized corroborator system 106. From operation 512, the method 500 proceeds to operation 514, where the localized corroborator system 106 concatenates the corroborator ID 116, the corroborator location 118, a time difference 604 between the time 120 and a current time, the session ID 600, and the message digest 112. From operation 514, the method 500 proceeds to operation 516, where the localized corroborator system 106 signs the concatenation created at operation 514 using the private key 122 to create the location proof P, such that P=Enc $(c_{id}\|l\|t\|\Delta t\|s_{id}\|h(u_{id} \oplus p_{id}))$. From operation 516, the method 500 proceeds to operation 518, where the localized corroborator system 106 sends the corroborator ID 116 and the proof P (e.g., as the signed message 124 in FIG. 1) to the user device 102. From operation 518, the method 500 proceeds to operation 520, where the method 500 ends.

The verifier 130 can test that the user ID 108 is created from the session ID 600, the biometric ID of the user 104, and the device ID. Furthermore, the time difference 604 can indicate a delay caused by transmission of data to a remote proxy if the user 104 attempts to do so. As before, the XOR of the user ID 108 and the proof ID 110 makes it impossible to discover even a single bit of the user ID 108 if the proof ID 110 is unknown.

In some cases, the user device 102 might transmit a device ID to another entity, such as a nearby access point or server. For example, many devices expose their MAC address to Wi-Fi access points. This exposure can be avoided or mitigated as an extra layer of security.

In some cases, the user 104 might need a location corroboration for a time period (e.g., a couple of hours). In these cases, each of the localized corroborator systems 106 issues a location proof when the user 104 is first detected, and then issues a continuation corroboration every period of time (e.g., every 15 minutes) by sending to the user device 102 Enc($c_{id}\|t\|s_{id}$) with the corroborator ID 116, the time 120, and the session ID 600 signed using the private key 122 of the localized corroborator system 106. This allows a location proof 128 to be associated with a sequence of times during which the user 104 was seen by the localized corroborator system 106, based upon the session ID 600. Since the added times are signed using the private key 122 of the localized corroborator system 106, the user 104 cannot fake these times.

The user 104 might not always know beforehand that he or she will need a location proof (or an alibi) and might be aware of the need at some time (e.g., hours or days) after the event for which he or she needs the location proof. To cope with these scenarios, the system can create the location corroborations automatically (e.g., every X hours). Since the location of the user 104 is not stored in any public component of the system, creating more corroborations does not increase the exposure of visited locations or the risk of a privacy breach.

The localized corroboration scheme described herein above provides a location proof 128 with an accuracy that is derived from the transmission and reception range (i.e., the local range) of the localized corroborator system 106. However, there are cases where the user 104 would like to obfuscate his or her exact location. For example, the user 104 might want to prove that he or she was in a certain city at a given time, without revealing anything about where exactly he or she was within the city. This concept is referred to herein as "obfuscated location corroboration."

Figure 7:
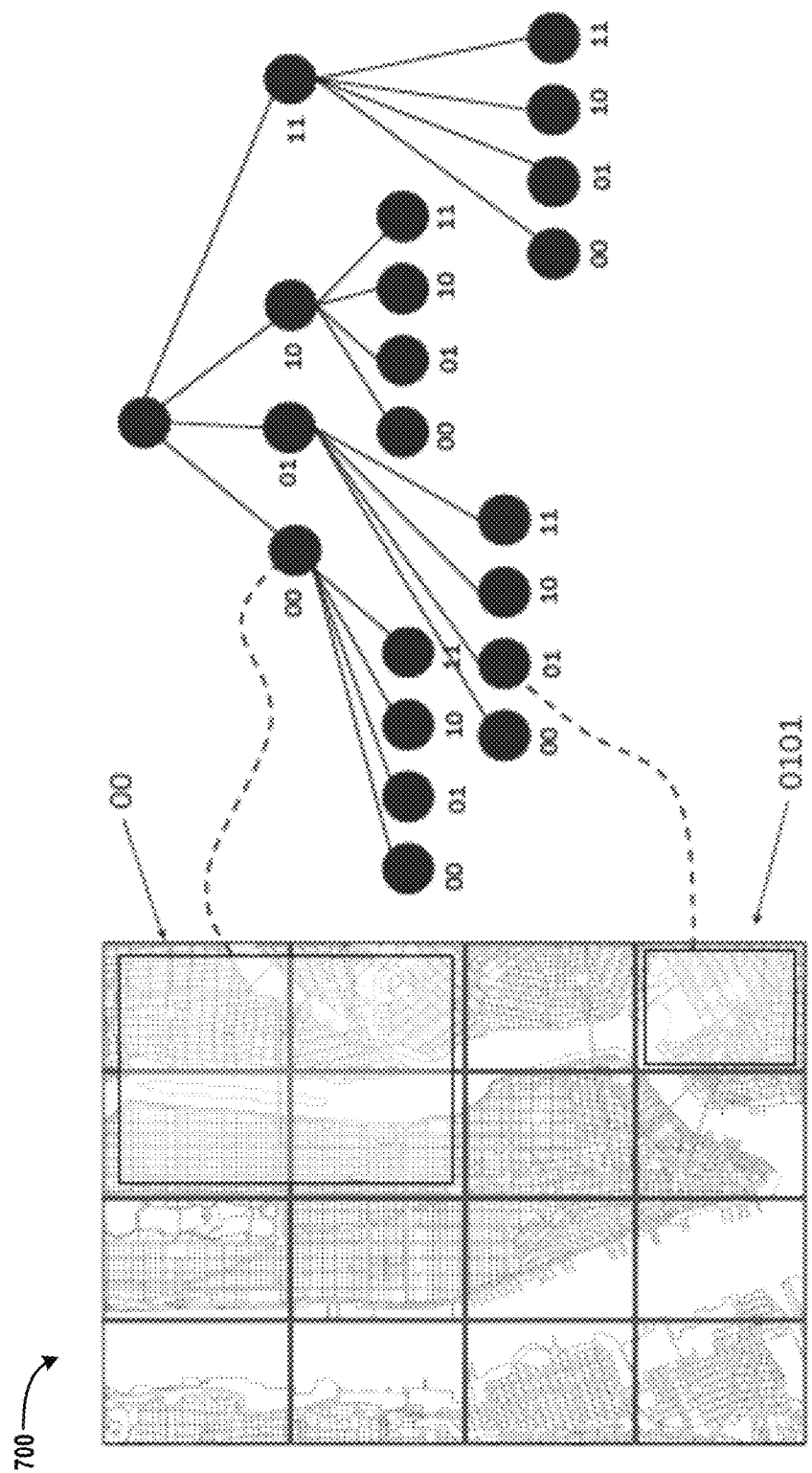
FIG. 7 is a diagram illustrating a quadtree data structure used to obfuscate a location of a user, according to an embodiment.

Turning now to FIG. 7, an encoded quadtree data structure 700 (also referred to herein as "quadtree 700") will be described, according to an illustrative embodiment. In the encoded quadtree data structure 700, each node is represented as a rectangular area. A node that is not a leaf has four children. The children of a node are created by partitioning the node into four rectangular parts. The partition of the node is done by a pair of horizontal lines and vertical lines. The root of a node is a rectangular area that includes the area the corroboration system covers.

The depth of a node is the length of the shortest path to the node from the root. The root has depth 0, the children of the root have length 1, and so on. The set of nodes with depth i is referred to as level i. The depth of the tree is the maximal depth among the nodes. The encoded quadtree data structure 700 shown in FIG. 7 has a depth of 2. The nodes in level 2 are the smallest rectangles. The nodes in level 1 are the four rectangles created when portioning the entire area horizontally and vertically in the middle. The root is the entire rectangular area.

The encoded quadtree data structure 700 is encoded by assigning to each node, except for the root, a binary number that represents the node order among the node's siblings. That is, for each node, 00 is assigned to the node's first child, 01 is assigned to the node's second child, 10 is assigned to the node's third child, and 11 is assigned to the node's fourth child. The encoding of a node is the concatenation of the labels of the nodes on the path from the root to the node. For example, in FIG. 7, the right upper rectangle in layer 1 is encoded by 00. The left bottom rectangle on level 2 is encoded by 01010.

An obfuscating corroborator can be created by a combination of a localized corroborator (e.g., the localized corroborator system 106) and an encoded quadtree (e.g., the encoded quadtree data structure 700). An encoded quadtree with depth d is built for the area the obfuscating corroborator covers. In some embodiments, there are general public key and private key shared by all the corroborators. Each corroborator is associated with the leaf node that contains it, and accordingly with the encoding of this node in the quadtree. For example, a corroborator located in the right bottom rectangle of the tree 700 will be encoded by 0101.

The corroborator encrypts the location in a way that allows revealing merely the desired level. The location corroboration includes d+1 parts. The location proof 128 described herein above with reference FIG. 2 can be modified for the obfuscating location corroboration scheme by removing the corroborator ID 116 from the proof (otherwise, the corroborator ID 116 might reveal the location of the user 104 with more accuracy than desired), and the location is written in an obfuscated manner. In particular, a code C can be defined as the encoding of the leaf that contains the corroborator. The code C is a sequence of 2d bits. The corroborator chooses a masking random sequence of 2d bits $M=m_1 \ldots, m_{2d}$, and provides the user 104 with a proof $P=\text{Enc}(C \oplus M \; c_{id} \| t \| \Delta t \oplus s_{id} \| h(u_{id} \oplus p_{id}))$. It should be noted that the corroborator ID 116 in the above location proof 128 is not revealed, and if no additional information is provided, the sequence $C \oplus M$ is merely a random sequence. To complete the creation of the location proof 128, the corroborator also provides the following d unmasking keys: $U_{level}=\text{Enc}(s_{id}\|level\|M'_{level})$, where level is the level of the node containing the corroborator that should be revealed; and $M'_i$, for i=level, is the sequence $m_1 \ldots, m_{2i}, 0, \ldots, 0$ of 2d bits such that the first 2i bits are equal to the first 2i bits of the mask M, and the other bits are zero.

As with a localized corroboration scheme disclosed above, in an obfuscated corroboration, the user 104 provides to the verifier 130 the location proof P 128 and the unmasking key $U_i$, where i is the desired level of unmasking. The verifier 130 decrypts the messages, checks that the session IDs are matching, and validates the user ID. In particular, L can be defined as the masked code of the corroborator location extracted from P. Then, by computing $M'_i \oplus L$, the first 2i bits provide the code of the quadtree node that contains the corroborator, and the other bits remain unchanged, and thus, are like random bits. The following example illustrates the process.

The right bottom node of the quadtree 700 in FIG. 7 is associated with the code 0101. If a random mask 1101 is created, then, in the location corroboration, the sequence $0101 \oplus 1101 = 1000$ will appear. This sequence does not reveal even a single bit of the leaf node containing the corroborator. This is because the mask is completely random. The unmask sequence for level 1 is 1100. Computing XOR of the masked location and the unmask sequence yields $1000 \oplus 1101 = 0101$, which reveals the code for the node on level 2 that contains the corroborator.

Since M is a random sequence of bits, the sequence $C \oplus M$ in the location corroboration provides no information about the location of the corroboration, when no additional information is provided. The sequence $U_i$ by itself provides no information about the location of the corroborator, because the sequence $U_i$ is only a manipulation of M. When the XOR $(C \oplus M) \oplus U_i$ is computed, the first 2i bits are the bits of the code C, and the other bits are the bits of M, so only the 2i bits that reveal a node in level i are disclosed. The verifier 130 has no information where exactly the user 104 was in the disclosed rectangular area.

The user 104 might store the proof P and the unmasking keys in different locations. In this manner, the user 104 can prevent the attacker 132 from revealing his or her location history if only P or only the unmasking keys are accessed.

Figure 8:
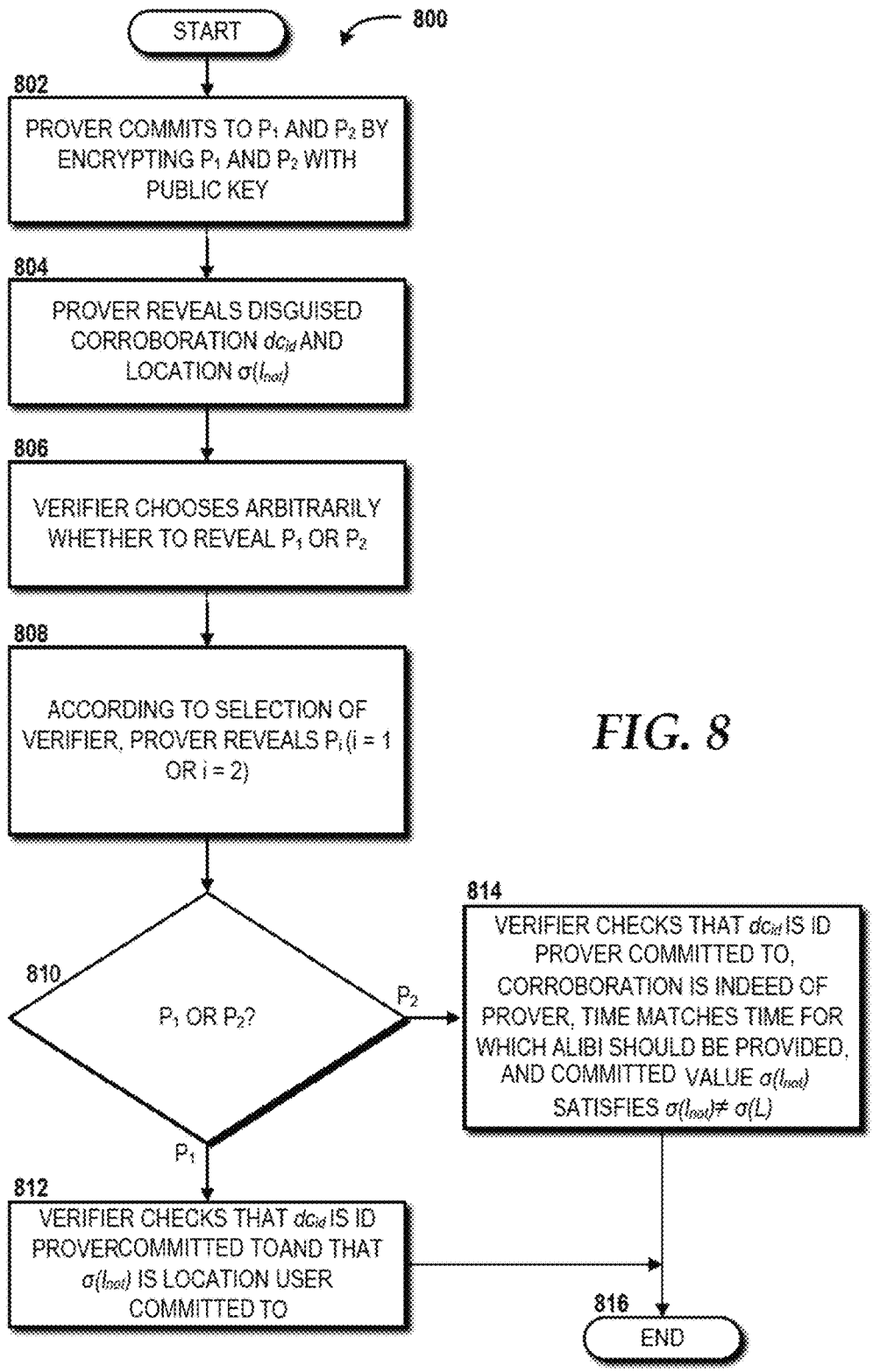
FIG. 8 is a flow diagram illustrating aspects of a method for creating a location proof in accordance with an illustrative obfuscated location corroboration scheme, according to an embodiment.

There are cases in which the user 104 needs to provide an alibi, that is, to show for a certain place that he or she was elsewhere at a specific time. The goal of the alibi is to do so without exposing the actual location where the user 104 was at that time. In consideration of this goal, FIG. 8 illustrates a method 800 for creating a location proof in accordance with an illustrative obfuscated location corroboration scheme, according to an illustrative embodiment.

Interactive zero-knowledge proofs allow the user 104 to prove a claim while the verifier 130 does not gain any information other than the correctness of the claim. In privacy-preserving alibis, there is a user u (e.g., the user 104) who at time t was in location $l_{was}$ and has a location corroboration for that location. The user u wants to prove that he or she was not in location $l_{not}$ at time t, assuming $l_{not}$ is remote from $l_{was}$, without revealing $l_{was}$ to the verifier 130. An alibi is described under the assumption that locations are leafs of a quadtree, such as the quadtree 700 presented in FIG. 7. That is, the area is partitioned by a grid into cells (leafs of the quadtree 700), and each location corroboration refers to a grid cell.

For enabling privacy-preserving alibis, a location corroboration consists of k disguised corroborations, where k is a parameter that controls the strength of the alibi. The k disguised corroborations can be supplied when the corroboration is generated, or can be created by the corroborator for an existing corroboration, when the alibi is needed, without revealing, to the corroborator, the identity of the user u (e.g., the user ID 108 of the user 104).

A disguised corroboration can be created from an original location corroboration $P=\text{Enc}(L\|t\|\Delta t\|s_{id}\|\text{digest } u_{id})$, where L is the code of the grid cell of the corroboration and digest $u_{id}$ is a message digest of the concealed user ID. The corroborator chooses uniformly a random permutation σ over all the grid cells and a large random number $dc_{id}$ to serve as the ID of the disguised corroboration. The disguised corroboration has two pieces. One piece is $\text{Enc}(dc_{id}\|\sigma)$. The other piece is $\text{Enc}(dc_{id}\|\sigma(l)\|t\|\Delta t\|s_{id}\|\text{digest } u_{id})$. Both pieces are encoded using the private key 122 of the corroborators, so the user 104 cannot fake the pieces without the private key 122. If both pieces are given to the verifier 130, the location of the user 104 would be revealed because the verifier 130 can decrypt the messages using the public key 122 of the corroborators and can compute $\sigma^{-1}(\sigma(L))$ by applying the inverse of σ on the location σ(L) that appears in the location proof. However, if the verifier 130 only sees one piece, there is no way to know the location of the user 104. The permutation a alone reveals nothing about the user's location. The location σ(L) can be any location. This is because a is chosen randomly.

For the zero-knowledge proof, it can be assumed that the prover has a private key and public key pair. The prover needs to prove that he or she was not in location $l_{not}$ at time t. The zero-knowledge proof to establish the alibi is conducted in (at most) k rounds. Each round is conducted with a different disguised corroboration, which has not been used before. Given the disguised corroboration $(P_1, P_2)$, where $P_1=\text{Enc}(dc_{id}\|\sigma)$, and $P_2=\text{Enc}(dc_{id}\|\sigma(l)\|t\|\Delta t\|s_{id}\|\text{digest } u_{id})$, the proof consists of the operations now described with reference to the method 800 shown in FIG. 8.

The method 800 begins and proceeds to operation 802, where the prover (i.e., the user 104) commits to $P_1$ and $P_2$ by encrypting $P_1$ and $P_2$ with his or her public key, and revealing only the resulting encrypted messages to the verifier 130. Due to the encryption, the verifier 130 gains no information during operation 802. From operation 802, the method 800 proceeds to operation 804, where the prover/user 104 reveals the disguised corroboration ID $dc_{id}$ and location $\sigma(l_{not})$. From operation 804, the method 800 proceeds to operation 806, where the verifier 130 chooses arbitrarily (e.g., randomly) whether to reveal $P_1$ or $P_2$.

From operation 806, the method 800 proceeds to operation 808, where, according to the selection made by the verifier 130 at operation 806, the prover/user 104 reveals $P_i$ (1=1 or 2). From operation 808, the method 800 proceeds to operation 810, where the verifier 130 determines whether $P_1$ or $P_2$ was revealed. If the verifier 130 determines that $P_1$ was revealed by the prover/user 104, the method 800 proceeds to operation 812, where the verifier 130 checks that $dc_{id}$ is the ID and $\sigma(l_{not})$ is the location that the prover/user 104 committed to. If, however, the verifier 130 determines that $P_2$ was revealed by the prover/user 104, the method 800 proceeds to operation 814, where the verifier 130 checks that $dc_{id}$ is the ID the prover/user 104 committed to, corroboration is indeed of the prover/user 104, time matches time for which alibi should be provided, and the committed valued $\sigma(l_{not})$ satisfies $\sigma(l_{not})\neq\sigma(l)$.

From operation 812 or from operation 814, the method 800 proceeds to operation 816. The method 800 ends at operation 816.

Figure 9:
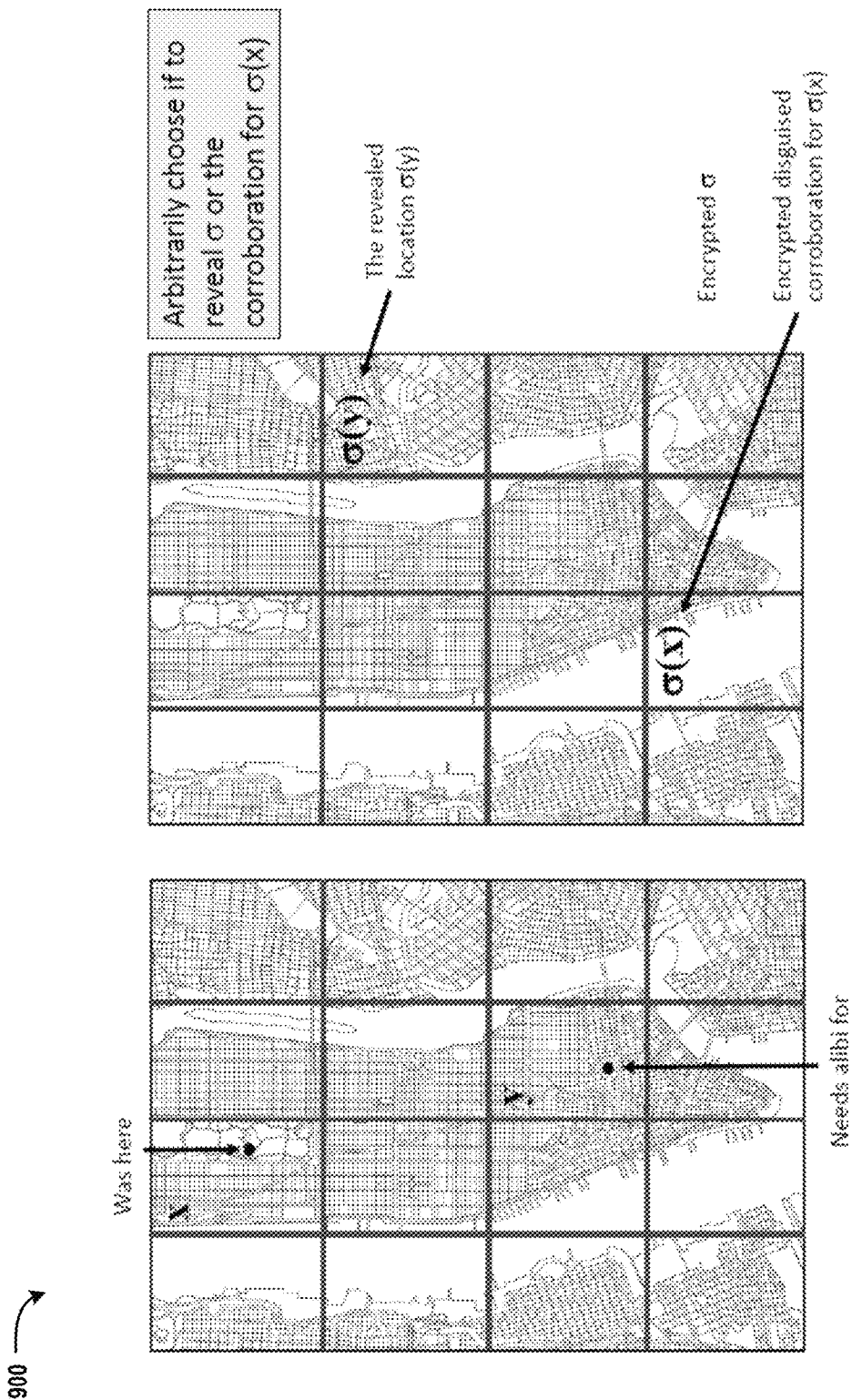
FIG. 9 is a diagram illustrating a setting for a zero-knowledge proof used to provide a privacy-preserving alibi, according to an embodiment.

Turning now to FIG. 9, a setting 900 for a zero-knowledge proof used to provide a privacy-preserving alibi will be described, according to an illustrative embodiment. In the illustrated example, the prover/user 104 was in location x and needs an alibi for location y. In each round, the location $\sigma(y)$ is revealed, and the prover/user 104 is either asked to provide a disguised corroboration for location $\sigma(x)$ or to reveal $\sigma$ (but not both).

The prover/user 104 always reveals $dc_{id}$, $\sigma(l_{not})$ and just one among $P_1$ and $P_2$. Clearly, $dc_{id}$ and $\sigma(l_{not})$ do not reveal the location $l_{was}$—that is, the place where the prover/user 104 was at time t. As described above, $P_1$ and $P_2$ alone do not reveal the location for which the corroboration was produced. Thus, each round of the proof does not reveal information about the user location. Since rounds are independent, a sequence of k rounds does not reveal the user location.

The prover/user 104 who wishes to deceive the system and get an alibi for location $l_{not}$ without having a corroboration for some other location would need to use a fake $P_1$ or $P_2$ in each round of verification. If one of the parts $P_1$ or $P_2$ is fake, there is a ½ chance that a fake part will be selected by the verifier 130. Thus, in k rounds, the chance the fake part will be chosen (operation 806 in the method 800 shown in FIG. 8) and the deception will be revealed is $$1-\frac{1}{2^k}.$$

For 7 rounds, the chance of a deceitful prover/user to succeed is less than 1%

$$\left(\text{i.e., }1-\frac{1}{2^7}\right),$$

and for 10 rounds, the chance falls to less than 0.1% During this process, the corroborator does not know who is the prover/user 104, and the verifier 130 does not know where the prover/user 104 was at time t.

The alibi scheme can be applied for any level of a quadtree (such as the quadtree 700 shown in FIG. 7). This can be used to guarantee that if some information is leaked, e.g., in a case where the public-key encryption is broken, the location would remain obscured.

If the user 104 needs an alibi for an area A (e.g., a neighborhood), the process can refer to the smallest node in the quadtree that contains A. The proof can be conducted with respect to this node and its level within the quadtree. When an alibi is needed for a location that is near the edge of a cell, the alibi can be provided not just for that node, but also for the node that shares this edge.

Figure 10:
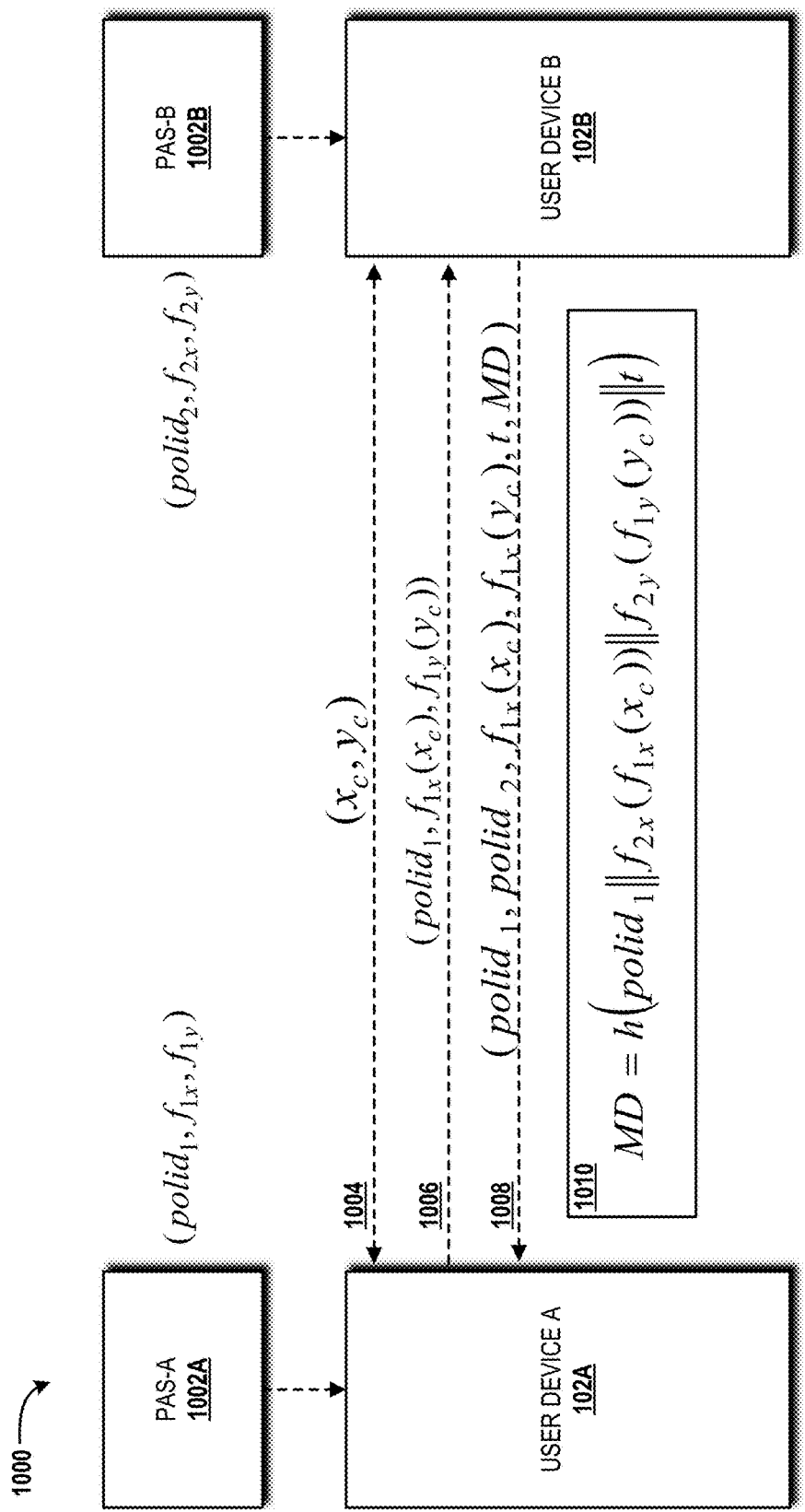
FIG. 10 is a diagram illustrating a crowd-based location corroboration scheme, according to an embodiment.

In some implementations, a localized corroborator, such as the localized corroborator system 106 might not be available. To provide location proofs in places where there is no localized corroborator but there are nearby people with mobile devices, a crowd-based corroboration scheme can be utilized. FIG. 10 illustrates an exemplary crowd-based corroboration system 1000 for implementing a crowd-based corroboration scheme. The illustrated crowd-based corroboration scheme is based upon mutual location proofs among user devices 102A, 102B. For the crowd-based corroboration scheme to work properly, it is assumed that each of the mobile devices have GPS or some other location determining technology that is capable of obtaining a location fix. A user might deceive and manipulate GPS readings in his or her own device, but he or she cannot alter the GPS readings in other devices.

The crowd-based corroboration scheme disclosed herein is built upon the premise that when two mobile devices are near each other, these devices can exchange information that would help them establish their location proofs 128. As mentioned above, the challenges of location corroboration include the ability to provide reliable corroborations, and to avoid exposing user locations to any entity that is not the verifier of the corroboration.

The localized corroboration scheme disclosed above in FIGS. 1-3 is not suitable for crowd-based corroboration because, in a localized corroboration scheme, the location 118 of the localized corroborator system 106 is known and can be exposed in the proof. This is undesirable when the corroborators are users whose location should not be exposed in proofs of other users. In addition, the localized corroboration scheme is based on public and private keys. This requires generating public and private keys for each user, managing the keys, and providing access to the public keys of the corroborators, which is complex and inefficient.

In a crowd-based corroboration scheme, polynomial functions over finite fields are utilized to cloak the locations of the users involved. A usage of polynomial functions over finite fields is in a secret-sharing scheme, wherein a concealed secret is a coefficient of the polynomial while the crowd-based corroboration scheme disclosed herein utilizes polynomials to conceal location points.

The area over which the system 1000 implementing the crowd-based corroboration scheme works can be partitioned by a grid into $N_x \times N_y$ squares. Each point location is associated with the indices of the grid cell that contain the point location. That is, a location is a pair (x, y) of grid cell indices, where $0 \leq x \leq N_x-1$ and $0 \leq y \leq N_y-1$. To create finite fields, $N_x$ and $N_y$ to be large prime numbers (not necessarily different from each other). The fields $\mathbb{F}_{Nx}=\mathbb{Z}/N_x\mathbb{Z}$ and $\mathbb{F}_{Ny}=\mathbb{Z}/N_y\mathbb{Z}$ are the integers $\mathbb{Z}$ modulo $N_x$ and $N_y$ in correspondence. The prime numbers can be chosen to be Mersenne primes (i.e., of the form $2^n-1$). Then, if the grid is of $(2^{n_1}-1)(2^{n_2}-1)$ cells, a quadtree can be created with up to $\min\{n_1, n_2\}$ levels by applying the partitioning as if the grid has $2^{n_1} \times 2^{n_2}$ cells.

A set of k points in a finite field does not reveal a polynomial of degree k that goes through the set. In particular, consider a field $\mathbb{F}_p=\mathbb{Z}/p\mathbb{Z}$ defined for some prime number p. Given k points $(x_j, y_j)$ in $\mathbb{F}_p \times \mathbb{F}_p$, where $x_i \neq x_j$ for $1 \leq i < j \leq m$, there are at least p polynomial functions $f$ of degrees at most k (over $\mathbb{F}_p$) that go via these points (i.e., where $f(x_j)=y_j$ for $1 \leq j \leq k$).

A set of k points that are on some unknown polynomial of degree k does not reveal another point on that polynomial. In particular, consider a field $\mathbb{F}_p=\mathbb{Z}/p\mathbb{Z}$ defined for some prime number p. Let S be a set of k points $(x_j, y_j)$, where $x_i \neq x_j$ for $1 \leq i < j \leq m$ and such that there is some unknown polynomial of degree k that goes through the k points. Then there are p(p-k) points $(x_{k+1}, y_{k+1})$ such that adding $(x_{k+1}, y_{k+1})$ to S defines a polynomial of degree k over the points in $S \cup \{(x_{k+1}, y_{k+1})\}$. This is because there are p-k options to choose $x_{k+1}$ such that $x_{k+1} \neq x_j$ for $1 \leq j \leq k$, and there are p options to choose $y_{k+1}$ in the field $\mathbb{F}_p$. For any selection of $(x_{x+1}, y_{k+1})$, the resulting polynomial $f(x) = \sum_{i=0}^{k} a_i x^i$ is solution over $\mathbb{F}_p$ to the set of k+1 linear equations:

$$\begin{pmatrix} 1 & x_1^2 & \cdots & x_1^k \\ 1 & x_2^2 & \cdots & x_2^k \\ \vdots & \vdots & \ddots & \vdots \\ 1 & x_{k+1}^2 & \cdots & x_{k+1}^k \end{pmatrix} \begin{pmatrix} a_0 \\ a_1 \\ \vdots \\ a_k \end{pmatrix} = \begin{pmatrix} y_1 \\ y_2 \\ \vdots \\ y_{k+1} \end{pmatrix}$$

to discover the coefficients $a_0, \ldots, a_k$.

In the crowd-based corroboration scheme, two central components are used to associate users with polynomials. One component provide random polynomials for masking the user location. This component is referred to herein as a polynomial association server A ("PAS-A") 1002A. The second component is responsible for random polynomials that serve as a secret in the creation of the corroboration. This component is referred to herein as a PAS-B 1002B.

The PAS-A 1002A and the PAS-B 1002B manage the association of random polynomials to the users 104 (not shown in FIG. 10). The PAS-A 1002A and the PAS-B 1002B manage lists of triples of a polynomial id (polid), a random polynomial over $\mathbb{F}_{Nx}$, and a random polynomial over $\mathbb{F}_{Ny}$. According to privacy demands discussed herein, both the PAS-A 1002A and the PAS-B 1002B do not get to see actual user locations. Both of these components have a public key and a private key to securely send polynomials and to sign the polynomials.

The polynomials of the PAS-A 1002A have a small degree (e.g., 1 or 2). The polynomials of PAS-B 1002B have a degree k, where $k < N_x$ and $k < N_y$. Each polynomial of the PAS-A 1002A is used just once. Each polynomial of the PAS-B 1002B is used for at most k different points to prevent discovery.

When a user 104 needs a new pair of polynomials, a triplet of an identifier polid, a random polynomial $f_x$ over $\mathbb{F}_{Nx}$, and a random polynomial $f_y$ over $\mathbb{F}_{Ny}$ are generated by PAS-A 1002A or PAS-B 1002B and sent in a secured way to the user's device. The PAS-A 1002A and the PAS-B 1002B maintain a list of all the (polid, $f_x$, $f_y$) triplets. The user device (e.g., user device A 102A or user device B 102B) stores its latest (polid, $f_x$, $f_y$) triplets. The PAS-A 1002A also sends to the user device A 102A signed triplet Enc (polid$\|f_x\|f_y$) so that the user device 102A could provide the connection of polid to the polynomials.

The polynomials of the PAS-B 1002B are of degree k. Note that when k, $N_x$ and $N_y$ are large, the number of possible polynomials is expected to be huge, much beyond a number that can be examined in an exhaustive way, as illustrated by the following example. Suppose $N_x = N_y = 8191$, for the prime Mersenne number 8191. An area of 400 km×400 km can be covered using grid cells of 50 m×50 m. For polynomials of degree 20, there are 8191−1 options to select the first coefficient and 8191 options for each one of the other coefficients. Thus, there are $8190 \cdot 8191^{20} > 10^{82}$ options to select a random polynomial.

The polynomial IDS (polid) such that the first b bits, say b=4, are based upon a user ID, such as the user ID 108. These bits are referred to herein as fuzzy-id bits and will be described in greater detail herein below. The number of bits b can be changed to increase security/privacy.

A corroboration is created as a result of an interaction between two devices, which, in the illustrated example, include user device A 102A and user device B 102B that communicate using a short-range wireless communications technology, such as, but not limited to, BLUETOOTH. If a first user (e.g., the user A 104A) associated with a first user device (e.g., the user device A 102A) wants a location corroboration from a second user (e.g., the user B 104B) associated with a second user device (e.g., the user device B 102B), (polid$_1$, $f_{1x}$, $f_{1y}$) can be defined as polynomials of the first user, achieved from the PAS-A 1002A with an ID associated with the user A 104A; and (polid$_2$, $f_{2x}$, $f_{2y}$) can be defined as polynomials of the second user, achieved from the PAS-B 1002B with an ID associated with the user B 104B. Moreover, h can be defined as a one-way hash function (i.e., message digest). The corroboration can be created in an accordance with the method shown in FIG. 11.

Figure 11:
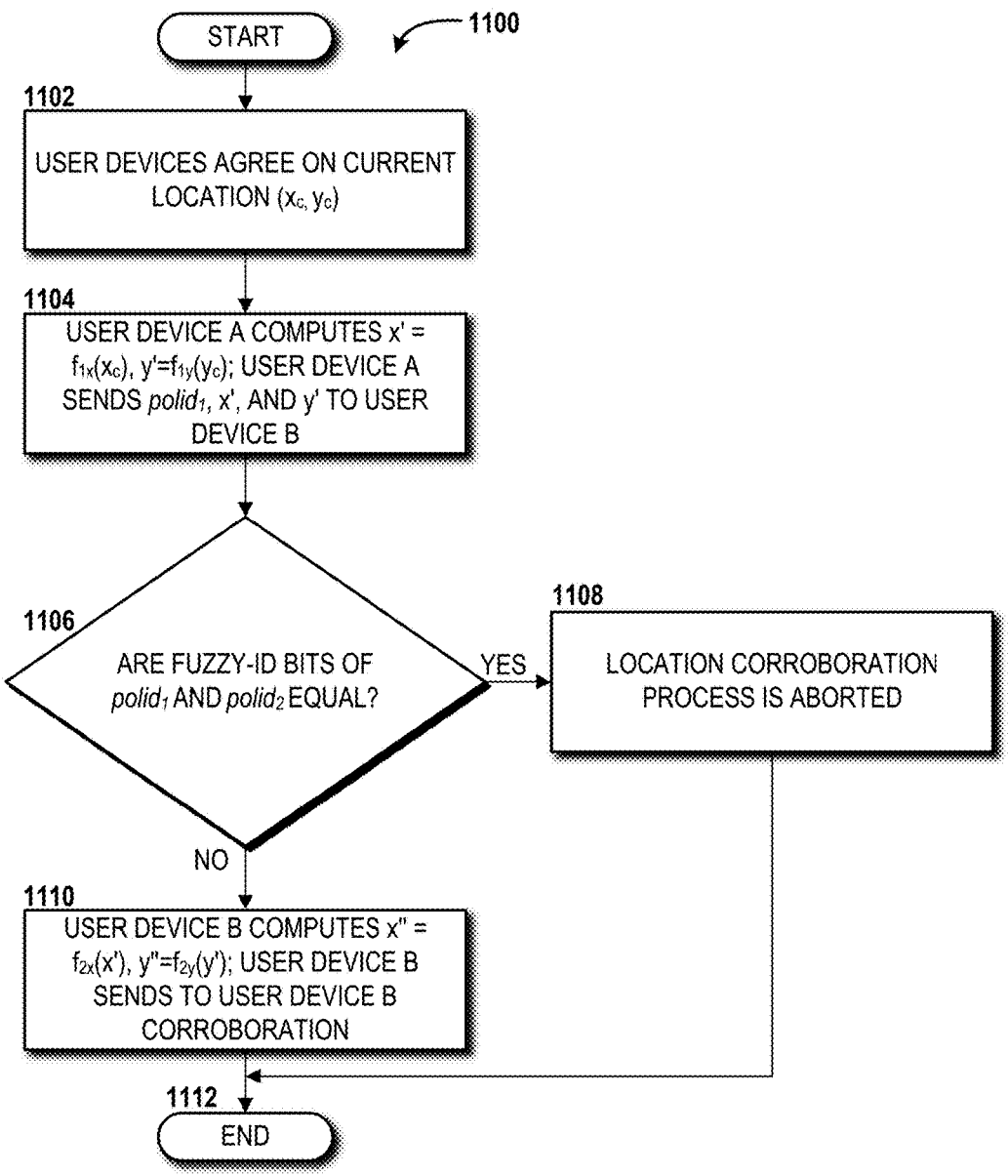
FIG. 11 is a method for creating a location proof in accordance with an illustrative crowd-based location corroboration scheme, according to an embodiment.

Turning now to FIG. 11, a method 1100 for creating a location proof in accordance with an illustrative crowd-based location corroboration scheme will be described, according to an illustrative embodiment. The method 1100 will be described with reference to FIG. 11 and additional reference to FIG. 10 introduced above.

The method 1100 begins and proceeds to operation 1102, where the user devices 102A, 102B agree on their current location $(x_c, y_c)$, as generally shown at 1004 in FIG. 10. The current location is used for the case where the user devices 102A, 102B are near a grid-cell border. From operation 1102, the method 1100 proceeds to operation 1104, where the user device A 102A computes $x' = f_{1x}(x_c)$, $y' = f_{1y}(y_c)$ and sends polid$_1$, x', and y' to the user device B 102B, as generally shown at 1006. From operation 1104, the method 1100 proceeds to operation 1106, where the user device B 102B determines whether the fuzzy-id bits of polid$_1$ and polid$_2$ are equal. If so, the method 1100 proceeds to operation 1108, where the location corroboration process is aborted. If, however, polid$_1$ and polid$_2$ are not equal, the method 1100 proceeds to operation 1110, where the user device B 102B computes $x'' = f_{2x}(x')$, $y'' = f_{2y}(y')$ and sends to the user device A 102A the corroboration (polid$_1$, polid$_2$, x', y', t, h(polid$_1\|x''\|y''\|$t)), as generally shown 1008, 1010. From operation 1110, the method 1100 proceeds to operation 1112, where the method 1100 ends.

Verification of a corroboration for location (x, y) can be done via the PAS-B 1002B. When verifying a corroboration of a user (e.g., the user A 104A), a verifier v (e.g., the verifier 130) sends to the PAS-B 1002B the corroboration (polid$_1$, polid$_2$, x', y', t, MD) of the user A 104A. The PAS-B 1002B finds the polynomials associated with polid$_2$ (e.g., $f_{2x}$ and $f_{2y}$), and checks that h(polid$_1\|f_{2x}(x')\|f_{2y}(y')\|$t)=MD. That is, the PAS-B 1002B applies the polynomials associated with polid on the location (x', y') and verifies that the message digest (MD) of the location and the time is equal to the message digest in the corroboration. When this is true, the PAS-B 1002B returns true to the verifier 130.

The verifier 130 checks that the fuzzy-id bits of polid$_1$ and polid$_2$ are unequal (see operation 1106). This prevents a user from creating corroborations by him/herself. Now, the verifier 130 has a proof for location (x', y'), associated with the identifier polid$_1$. To complete the verification, the user presents Enc(polid$_1$, $f_{1x}$, $f_{1y}$) to the verifier—that is, the association of the ID polid$_1$ to the polynomials $f_{1x}$, $f_{1y}$, and the verifier checks that $f_{1x}(x) = x'$ and $f_{1y}(y) = y'$.

Another example implementation of the crowd-based corroboration scheme will now be described. For this example, an area is partitioned into a 7×7 grid, and as such, all the computations are over $\mathbb{F}_7$—that is, $\mathbb{Z}$ modulo 7. Suppose that the user device A 102A receives from the PAS-A 1002A the polynomials $f_{Ax}(x)=2x+3$, $f_{Ay}(y)=3y+6$ and polid$_A$=12345678. Also suppose that the user device B 102B receives from the PAS-B 1002B the polynomials $f_{Bx}(x)=3x^3+x^2+3x+6$ and $f_{By}(y)=2x^3+2x^2+x+5$ with polid$_B$=87654321. Note that the user device B 102B has polynomials of degree 3 and hence can use the polynomials at most 3 times. Moreover, let (2, 1) be the location for which the user device A 102A wants a corroboration. The user device A 102A computes $f_{Ax}(2)=0$ and $f_{Ay}(1)=2$ (over $\mathbb{F}_7$) and sends (0, 2, 12345678) to the user device B 102B. The user device B 102B computes $f_{Bx}(0)=6$ and $f_{By}(2)=4$, and sends to the user device A 102A the corroboration (12345678, 87654321, 0, 2, Jan-1-2016-8:30, MD) where the last part is a message digest of the concatenation of 12345678, 6, 4, and the time Jan-1-2016-8:30, separated by space. Since the user device A 104A does not know the values 6 and 4, the user device A 104A cannot generate the corroboration alone.

When the user device A 104A wants to prove to the verifier 130 that its location at time Jan-1-2016-8:30, the user device A 104A presents to the verifier 130 the corroboration. The verifier 130 in turn sends to the PAS-B 1002B the information, and the PAS-B 1002B finds the polynomials associated with polid 87654321. The PAS-B 1002B applies the polynomials on the coordinates (0, 2) of the masked location, getting the values 6 and 4, and checks that the message digest of the concatenation of 12345678, 6, 4, and the time Jan-1-2016-8:30 is equal to the message digest MD in the corroboration. The verifier 130 receives from the PAS-B 1002B a verification of the validity of the corroboration. Now, the user device A 102A reveals to the verifier 130 the polynomials $f_{Ax}$ and $f_{Ay}$, and the verifier 130 verifies that $f_{Ax}(2)=0$ and $f_{Ay}(1)=2$.

The verifier 130 does not know who gave the user device A 102A the corroboration. The PAS-B 1002B only sees the masked location (0, 2), not the actual location of the user device A 102A or the user device B 102B. Even if the user device A 102A (or the verifier 130) sees three corroborations of the user device B 102B with the same polynomial identifier, the user device A 102A (or the verifier 130) cannot reconstruct the polynomials to create fake corroborations using the secret associated with the user device B 102B.

The aforementioned corroboration scheme provides privacy such that locations are not revealed unnecessarily. When the PAS-A 1002A and the PAS-B 1002B send polynomials to the user devices 102A, 102B, the PAS-A 1002A and the PAS-B 1002B do not see any location. When the PAS-B 1002B verifies a corroboration (polid$_1$, polid$_2$, x', y', t, MD), it can merely associate polid$_2$ with a place that is masked by the polynomials of some unknown user, hence, this does not reveal the location of any specific user, and in particular, does not expose the location of the user device 102B.

In the proposed scheme, polid$_1$ is not known to the PAS-B 1002B to prevent a case where the PAS-B 1002B would apply the inverse of the polynomials associated with polid$_1$ on x' and x' to reveal the actual location for which the corroboration is intended. This is a reason for using two servers—the PAS-A 1002A and the PAS-B 1002B—rather than using a single server. The PAS-A 1002A does not need to see the polynomials it stores. It is possible that the user device A 102A would create the polynomials $f_{1x}$, $f_{1y}$, and would only use the PAS-A 1002A to store encryption Enc(polid$_1$, $f_{1x}$, $f_{1y}$). This would allow using the PAS-A 1002A to support a commitment of a user to the association between polid$_1$, and $f_{1x}$, $f_{1y}$ without revealing $f_{1x}$, $f_{1y}$ to the PAS-A 1002A.

A verifier sees polid$_2$ and can associate this number with the verified location, however, polid$_2$ is just an arbitrary temporary number that does not reveal the identity of the user who holds it. Hence, the verifier does not learn about the location of any user except for the location of u$_1$ at time t, which is what u$_1$ wants to prove.

The fuzzy-id bits in the polynomial ids provide a partition of the population into 2b groups, e.g., when b=4, each user is in one of 16 groups, so it is not an actual identification. Reliability of the method means that a user cannot fake a corroboration. First, consider a case of a user u$_1$ that tries to generate a corroboration (polid$_1$, polid$_2$, x', y', t, h(polid$_1$∥x"∥y"∥t) without having (polid$_2$, $f_{2x}$, $f_{2y}$). Even if the user has a valid polid$_2$ number, there are too many options of $f_{2x}$, $f_{2y}$ for the user to guess. Second, suppose a user tries creating a corroboration for himself or herself. This would yield polid$_1$ and polid$_2$ with the same initial b bits, and would be rejected by the verifier. Third, if a user u$_1$ is in location (x$_1$, x$_2$) and tries to deceive by sending to u$_2$ coordinates that are not $f_{1x}(x)$, $f_{1y}(y)$, then the last step of the verification of associating polid1 with the functions $f_{1x}$ and $f_{1y}$, and checking that indeed $f_{1x}(x)=x'$ and $f_{1y}(y)=y'$, will fail. Fourth, consider a user who tries to learn from a corroboration, or from several corroborations, the polynomials $f_{2x}$, $f_{2y}$. This can be a user that asks for a corroboration or a verifier. Since the polynomials are used only for the creation of at most k points, from seeing the points, an attacker cannot reconstruct the polynomials or infer new points.

Figure 12:
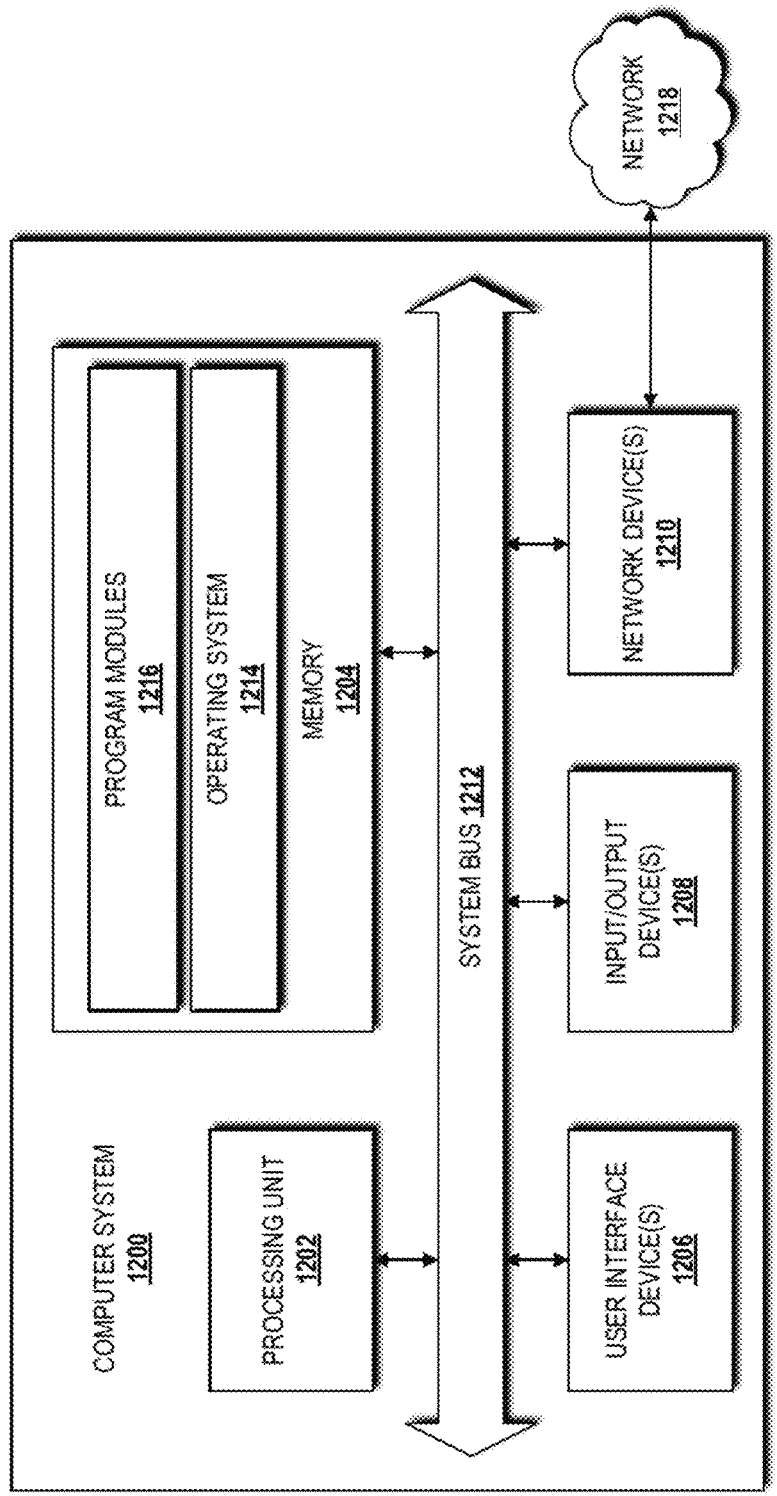
FIG. 12 is a block diagram illustrating an example computer system and components thereof capable of implementing aspects of the embodiments presented herein.

Turning now to FIG. 12 is a block diagram illustrating a computer system 1200 configured to provide the functionality in accordance with various embodiments of the concepts and technologies disclosed herein. The systems, devices, and other components disclosed herein can utilize, at least in part, an architecture that is the same as or at least similar to the architecture of the computer system 1200. For example, the user device(s) 102, the localized corroborator system(s) 106, and/or the verifier 130 can utilize, at least in part, an architecture that is the same as or at least similar to the architecture of the computer system 1200. It should be understood, however, that modification to the architecture may be made to facilitate certain interactions among elements described herein.

The computer system 1200 includes a processing unit 1202, a memory 1204, one or more user interface devices 1206, one or more I/O devices 1208, and one or more network devices 1210, each of which is operatively connected to a system bus 1212. The bus 1212 enables bi-directional communication between the processing unit 1202, the memory 1204, the user interface devices 1206, the I/O devices 1208, and the network devices 1210.

The processing unit 1202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1204 communicates with the processing unit 1202 via the system bus 1212. In some embodiments, the memory 1204 is operatively connected to a memory controller (not shown) that enables communication with the processing unit 1202 via the system bus 1212. The illustrated memory 1204 includes an operating system 1214 and one or more program modules 1216. The operating system 1214 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1216 may include various software and/or program modules to perform the various operations described herein. The program modules 1216 and/or other programs can be embodied in computer-readable media containing instructions that, when executed by the processing unit 1202, perform various operations such as those described herein. According to embodiments, the program modules 1216 may be embodied in hardware, software, firmware, or any combination thereof.

By way of example, and not limitation, computer-readable media may include any available computer storage media or communication media that can be accessed by the computer system 1200. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1200. In the claims, the phrase "computer storage medium" and variations thereof does not include waves or signals per se and/or communication media.

The user interface devices 1206 may include one or more devices with which a user accesses the computer system 1200. The user interface devices 1206 may include, but are not limited to, computers, servers, personal digital assistant ("PDAs"), cellular phones, or any suitable computing devices. The I/O devices 1208 enable a user to interface with the program modules 1216. In one embodiment, the I/O devices 1208 are operatively connected to an I/O controller (not shown) that enables communication with the processing unit 1202 via the system bus 1212. The I/O devices 1208 may include one or more input devices, such as, but not limited to, a keyboard, a mouse, or an electronic stylus. Further, the I/O devices 1208 may include one or more output devices, such as, but not limited to, a display screen or a printer. In some embodiments, the I/O devices 1208 can be used for manual controls for operations to exercise under certain emergency situations.

The network devices 1210 enable the computer system 1200 to communicate with other networks or remote systems via a network 1218. Examples of the network devices 1210 include, but are not limited to, a modem, a radio frequency ("RF") or infrared ("IR") transceiver, a telephonic interface, a bridge, a router, or a network card. The network 1218 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1218 may be or may include a wired network such as, but not limited to, a Wide Area Network ("WAN"), a wired Personal Area Network ("PAN"), or a wired Metropolitan Area Network ("MAN"). The network 1218 can be or can include any network or combination of networks described herein.

Figure 13:
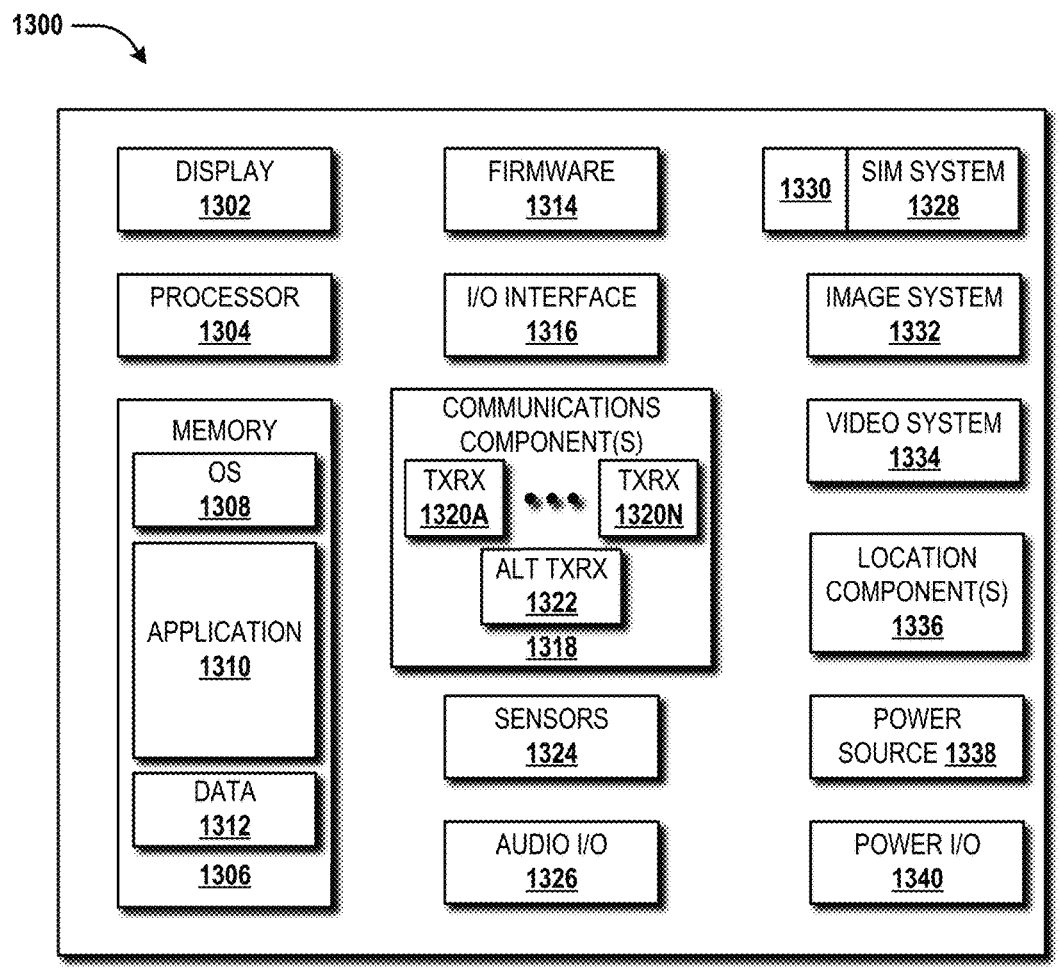
FIG. 13 is a block diagram illustrating an example mobile device and components thereof capable of implementing aspects of the embodiments presented herein.

Turning now to FIG. 13, an illustrative mobile device 1300 and components thereof will be described. In some embodiments, the user device(s) 102 can be configured like the mobile device 1300. While connections are not shown between the various components illustrated in FIG. 13, it should be understood that some, none, or all of the components illustrated in FIG. 13 can be configured to interact with one other to carry out various device functions. In some embodiments, the components are arranged so as to communicate via one or more busses (not shown). Thus, it should be understood that FIG. 13 and the following description are intended to provide a general understanding of a suitable environment in which various aspects of embodiments can be implemented, and should not be construed as being limiting in any way.

As illustrated in FIG. 13, the mobile device 1300 can include a display 1302 for displaying data. According to various embodiments, the display 1302 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 1300 also can include a processor 1304 and a memory or other data storage device ("memory") 1306. The processor 1304 can be configured to process data and/or can execute computer-executable instructions stored in the memory 1306. The computer-executable instructions executed by the processor 1304 can include, for example, an operating system 1308, one or more applications 1310, other computer-executable instructions stored in a memory 1306, or the like. In some embodiments, the applications 1310 also can include a user interface ("UI") application (not illustrated in FIG. 13).

The UI application can interface with the operating system 1308 to facilitate user interaction with functionality and/or data stored at the mobile device 1300 and/or stored elsewhere. In some embodiments, the operating system 1308 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPO- RATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1304 to aid a user entering content, viewing account information, answering/initiating calls, entering/deleting data, entering and setting user IDs and passwords for device access, configuring settings, manipulating address book content and/or settings, multimode interaction, interacting with other applications 1310, and otherwise facilitating user interaction with the operating system 1308, the applications 1310, and/or other types or instances of data 1312 that can be stored at the mobile device 1300. According to various embodiments, the applications 1310 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The applications 1310, the data 1312, and/or portions thereof can be stored in the memory 1306 and/or in a firmware 1314, and can be executed by the processor 1304. The firmware 1314 also can store code for execution during device power up and power down operations. It can be appreciated that the firmware 1314 can be stored in a volatile or non-volatile data storage device including, but not limited to, the memory 1306 and/or a portion thereof.

The mobile device 1300 also can include an input/output ("I/O") interface 1316. The I/O interface 1316 can be configured to support the input/output of data such as database data, location information, user information, organization information, presence status information, user IDs, passwords, and application initiation (start-up) requests. In some embodiments, the I/O interface 1316 can include a hardwire connection such as universal serial bus ("USB") port, a mini-USB port, a micro-USB port, an audio jack, a PS2 port, an Institute of Electrical and Electronics Engineers ("IEEE") 1394 ("FIREWIRE") port, a serial port, a parallel port, an Ethernet (RJ45) port, an RJ10 port, a proprietary port, combinations thereof, or the like. In some embodiments, the mobile device 1300 can be configured to synchronize with another device to transfer content to and/or from the mobile device 1300. In some embodiments, the mobile device 1300 can be configured to receive updates to one or more of the applications 1310 via the I/O interface 1316, though this is not necessarily the case. In some embodiments, the I/O interface 1316 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1316 may be used for communications between the mobile device 1300 and a network device or local device.

The mobile device 1300 also can include a communications component 1318. The communications component 1318 can be configured to interface with the processor 1304 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 1318 includes a multimode communications subsystem for facilitating communications via the cellular network and one or more other networks.

The communications component 1318, in some embodiments, includes one or more transceivers. The one or more transceivers, if included, can be configured to communicate over the same and/or different wireless technology standards with respect to one another. For example, in some embodiments one or more of the transceivers of the communications component 1318 may be configured to communicate using Global System for Mobile communications ("GSM"), Code-Division Multiple Access ("CDMA") ONE, CDMA2000, Long-Term Evolution ("LTE"), and various other 2G, 2.5G, 3G, 4G, 5G, and greater generation technology standards. Moreover, the communications component 1318 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 1318 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 1318 can include a first transceiver ("TxRx") 1320A that can operate in a first communications mode (e.g., GSM). The communications component 1318 also can include an $N^{th}$ transceiver ("TxRx") 1320N that can operate in a second communications mode relative to the first transceiver 1320A (e.g., UMTS). While two transceivers 1320A-1320N (hereinafter collectively and/or generically referred to as "transceivers 1320") are shown in FIG. 13, it should be appreciated that less than two, two, and/or more than two transceivers 1320 can be included in the communications component 1318.

The communications component 1318 also can include an alternative transceiver ("Alt TxRx") 1322 for supporting other types and/or standards of communications. According to various contemplated embodiments, the alternative transceiver 1322 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 1318 also can facilitate reception from terrestrial radio networks, digital satellite radio networks, internet-based radio service networks, combinations thereof, and the like. The communications component 1318 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1300 also can include one or more sensors 1324. The sensors 1324 can include temperature sensors, light sensors, air quality sensors, movement sensors, orientation sensors, noise sensors, proximity sensors, or the like. As such, it should be understood that the sensors 1324 can include, but are not limited to, accelerometers, magnetometers, gyroscopes, infrared sensors, noise sensors, microphones, combinations thereof, or the like. Additionally, audio capabilities for the mobile device 1300 may be provided by an audio I/O component 1326. The audio I/O component 1326 of the mobile device 1300 can include one or more speakers for the output of audio signals, one or more microphones for the collection and/or input of audio signals, and/or other audio input and/or output devices.

The illustrated mobile device 1300 also can include a subscriber identity module ("SIM") system 1328. The SIM system 1328 can include a universal SIM ("USIM"), a universal integrated circuit card ("UICC") and/or other identity devices. The SIM system 1328 can include and/or can be connected to or inserted into an interface such as a slot interface 1330. In some embodiments, the slot interface 1330 can be configured to accept insertion of other identity cards or modules for accessing various types of networks. Additionally, or alternatively, the slot interface 1330 can be configured to accept multiple subscriber identity cards. Because other devices and/or modules for identifying users and/or the mobile device 1300 are contemplated, it should be understood that these embodiments are illustrative, and should not be construed as being limiting in any way.

The mobile device 1300 also can include an image capture and processing system 1332 ("image system"). The image system 1332 can be configured to capture or otherwise obtain photos, videos, and/or other visual information. As such, the image system 1332 can include cameras, lenses, charge-coupled devices ("CCDs"), combinations thereof, or the like. The mobile device 1300 may also include a video system 1334. The video system 1334 can be configured to capture, process, record, modify, and/or store video content. Photos and videos obtained using the image system 1332 and the video system 1334, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 1300 also can include one or more location components 1336. The location components 1336 can be configured to send and/or receive signals to determine a geographic location of the mobile device 1300. According to various embodiments, the location components 1336 can send and/or receive signals from global positioning system ("GPS") devices, assisted GPS ("A-GPS") devices, WI-FI/WIMAX and/or cellular network triangulation data, combinations thereof, and the like. The location component 1336 also can be configured to communicate with the communications component 1318 to retrieve triangulation data for determining a location of the mobile device 1300. In some embodiments, the location component 1336 can interface with cellular network nodes, telephone lines, satellites, location transmitters and/or beacons, wireless network transmitters and receivers, combinations thereof, and the like. In some embodiments, the location component 1336 can include and/or can communicate with one or more of the sensors 1324 such as a compass, an accelerometer, and/or a gyroscope to determine the orientation of the mobile device 1300. Using the location component 1336, the mobile device 1300 can generate and/or receive data to identify its geographic location, or to transmit data used by other devices to determine the location of the mobile device 1300. The location component 1336 may include multiple components for determining the location and/or orientation of the mobile device 1300.

The illustrated mobile device 1300 also can include a power source 1338. The power source 1338 can include one or more batteries, power supplies, power cells, and/or other power subsystems including alternating current ("AC") and/or direct current ("DC") power devices. The power source 1338 also can interface with an external power system or charging equipment via a power I/O component 1340. Because the mobile device 1300 can include additional and/or alternative components, the above embodiment should be understood as being illustrative of one possible operating environment for various embodiments of the concepts and technologies described herein. The described embodiment of the mobile device 1300 is illustrative, and should not be construed as being limiting in any way.

Figure 14:
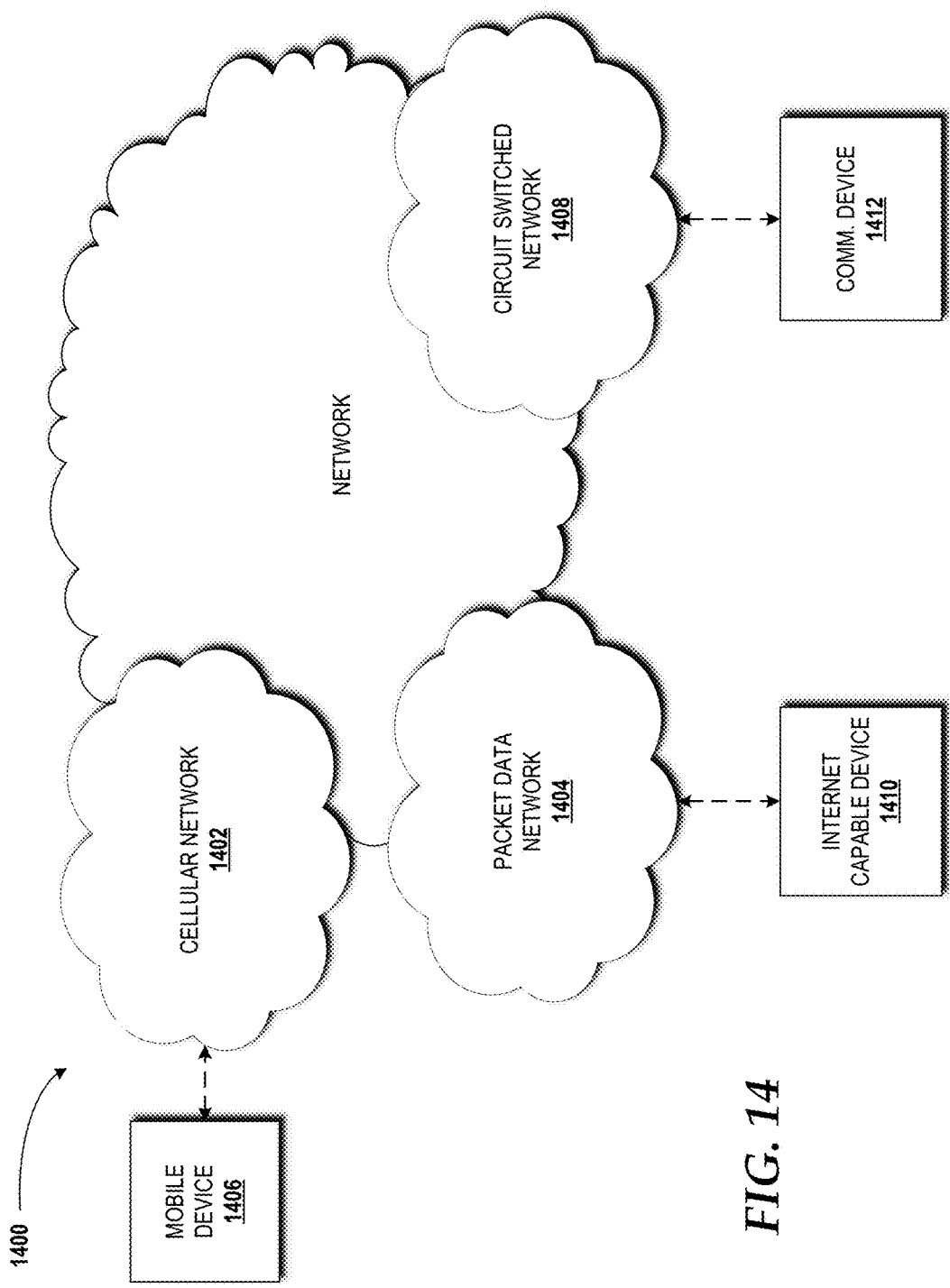
FIG. 14 is a block diagram illustrating an example network capable of implementing aspects of the embodiments presented herein.

Turning now to FIG. 14, details of a network 1400 are illustrated, according to an illustrative embodiment. The network 1400 includes a cellular network 1402, a packet data network 1404, and a circuit switched network 1408, for example, a publicly switched telephone network ("PSTN").

The cellular network 1402 includes various components such as, but not limited to, base transceiver stations ("BTSs"), nodeBs ("NBs"), eNBs, base station controllers ("BSCs"), radio network controllers ("RNCs"), mobile switching centers ("MSCs"), MMEs, SGWs, PGWs, short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1402 also includes radios and nodes for receiving and transmitting voice, data, and combinations thereof to and from radio transceivers, networks, the packet data network 1404, and the circuit switched network 1408.

A mobile communications device 1406, such as, for example, the user device(s) 102, a computing device, a cellular telephone, a mobile terminal, a PDA, a laptop computer, a handheld computer, and combinations thereof, can be operatively connected to the cellular network 1402. The cellular network 1402 can be configured as a 2G GSM network and can provide data communications via GPRS and/or EDGE. Additionally, or alternatively, the cellular network 1402 can be configured as a 3G UMTS network and can provide data communications via the HSPA protocol family, for example, HSDPA, EUL (also referred to as HSUPA), and HSPA+. The cellular network 1402 also is compatible with 4G mobile communications standards as well as evolved and future mobile standards.

The packet data network 1404 includes various devices, for example, servers, computers, databases, and other devices in communication with one another, as is generally known. The packet data network 1404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1404 includes or is in communication with the Internet. The circuit switched network 1408 includes various hardware and software for providing circuit switched communications. The circuit switched network 1408 may include, or may be, what is often referred to as a plain old telephone system ("POTS"). The functionality of a circuit switched network 1408 or other circuit-switched network are generally known and will not be described herein in detail.

The illustrated cellular network 1402 is shown in communication with the packet data network 1404 and a circuit switched network 1408, though it should be appreciated that this is not necessarily the case. One or more Internet-capable devices 1410, for example, a PC, a laptop, a portable device, or another suitable device, can communicate with one or more cellular networks 1402, and devices connected thereto, through the packet data network 1404. It also should be appreciated that the Internet-capable device 1410 can communicate with the packet data network 1404 through the circuit switched network 1408, the cellular network 1402, and/or via other networks (not illustrated).

As illustrated, a communications device 1412, for example, a telephone, facsimile machine, modem, computer, or the like, can be in communication with the circuit switched network 1408, and therethrough to the packet data network 1404 and/or the cellular network 1402. It should be appreciated that the communications device 1412 can be an Internet-capable device, and can be substantially similar to the Internet-capable device 1410. In the specification, the network 1400 is used to refer broadly to any combination of the networks 1402, 1404, 1408. It should be appreciated that substantially all of the functionality described with reference to the network 1400 can be performed by the cellular network 1402, the packet data network 1404, and/or the circuit switched network 1408, alone or in combination with other networks, network elements, and the like.

Concepts and technologies disclosed herein are directed to privacy-preserving location corroborations. According to one aspect of the concepts and technologies disclosed herein above, a verifier system can receive, from a user device, a corroborator identifier and a location proof. The verifier system can obtain a public key from a localized corroborator system. The verifier system can decrypt, via the public key, the location proof. The verifier system can determine whether the proof is correct. If the verifier system determines that the proof is incorrect, the verifier system can reject the claim that the location proof is valid. If the verifier system determines that the proof is correct, the verifier system can extract a location of the localized corroborator system, a time, and a message digest from the location proof. The verifier system can then receive, from the user device, a user identifier and a location proof identifier and determine whether the user identifier is valid. If the verifier system determines that the user identifier is not valid, the verifier system can reject the claim that the location proof is valid. If, however, the verifier system determines that the user identifier is valid, the verifier system can accept the claim that the location proof is valid. According to another aspect of the concepts and technologies disclosed herein, a localized corroborator system can receive, from a user device, a proof initiation message, record a start time, generate a session identifier, and send the session identifier to the user device. In response, the localized corroborator system can receive, from the user device, the session identifier and a message digest. The message digest can be generated by the user device using a cryptographic hash function based upon a bitwise XOR or a user identifier and the location proof identifier. The user identifier uniquely identifies a user associated with the user device. The location proof identifier uniquely identifies a location proof. The localized corroborator system can concatenate a corroborator identifier, a location, a difference between the start time and a current time, the session identifier, and the message digest to create a concatenated message. The corroborator identifier can uniquely identify the localized corroborator system. The localized corroborator system can sign the concatenated message using a private key to create the location proof and can send the corroborator identifier and the location proof to the user device. The user identifier can be generated uniquely for the creation of the location proof. In some embodiments, the user identifier generated by the user device based, at least in part, upon a biometric of the user, a device identifier that uniquely identifies the user device, and the session identifier. In some embodiments, the user identifier includes a hash of a concatenation of the biometric, the device identifier, and the session identifier. The device identifier can be, for example, a MAC address, an IMSI associated with a SIM installed in the user device, or an IMEI.

According to another aspect of the concepts and technologies, a disguised location corroboration can be created from an original location corroboration. A corroborator system can choose uniformly a random permutation over all grid cells and a large random number to serve as a disguised corroboration identifier. The disguised corroboration can include two pieces, wherein both pieces are encoded using a private key of the corroborator system. A prover device, such as a user device associated with a user who wants to prove that he or she was not in a certain location, can commit to both pieces by encrypting them using a public key and revealing only the resulting encrypted messages to a verifier system. The prover device can reveal to the verifier system the disguised corroboration identifier and the location. The verifier system can choose randomly whether to request the prover device to reveal the first piece or the second piece of the disguised corroboration. In response, the prover device can reveal the requested piece. The verifier system can determine whether the first piece or the second piece was revealed by the prover device. If the verifier system determines that the first piece was revealed by the prover device, the verifier system can check that the disguised corroboration identifier is the correct identifier and the location is the location to which the prover device committed. If, however, the verifier system determines that the second piece was revealed by the prover device, the verifier system can check that disguised corroboration identifier to which the prover device committed is indeed that of the prover device, time matches time for which alibi should be provided, and the location is the location to which the prover device committed.

Based on the foregoing, it should be appreciated that concepts and technologies directed to privacy-preserving location corroborations have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A localized corroborator system comprising:
    a processor; and
    a memory comprising instructions that, when executed by the processor, cause the processor to perform operations comprising
        receiving a proof initiation message from a user device, wherein the proof initiation message requests a location proof to be created for use by the user device to prove that a user associated with the user device was located at a location at a time,
        in response to receiving the proof initiation message from the user device,
            recording the time,
            generating a session identifier that uniquely identifies a communications session between the user device and the localized corroborator system, and
            sending the session identifier to the user device,
        receiving the session identifier and a message digest from the user device, wherein the message digest comprises a bitwise XOR of a user identifier and a location proof identifier generated by the user device using a cryptographic hash function, wherein the user identifier uniquely identifies the user associated with the user device, and the location proof identifier uniquely identifies the location proof to be created by the localized corroborator system,
        concatenating a corroborator identifier, the location, a time difference between the time and a current time, the session identifier, and the message digest to create a concatenated message, wherein the corroborator identifier uniquely identifies the localized corroborator system,
        signing the concatenated message using a private key to create the location proof, and
        sending the corroborator identifier and the location proof to the user device for use by the user device to prove that the user was located at the location at the time.

2. The localized corroborator system of claim 1, wherein the location proof identifier comprises a random number with a same number of bits as the user identifier.

3. The localized corroborator system of claim 1, wherein the user identifier is based, at least in part, upon a biometric of the user.

4. The localized corroborator system of claim 3, wherein the user identifier is generated by the user device based, at least in part, upon the biometric of the user, a device identifier that uniquely identifies the user device, and the session identifier that uniquely identifies the communications session between the user device and the localized corroborator system.

5. The localized corroborator system of claim 4, wherein the device identifier comprises a media access control address, an international mobile subscriber identity associated with a subscriber identity module installed in the user device, or an international mobile equipment identity.

6. The localized corroborator system of claim 4, wherein the user identifier comprises a hash of a concatenation of the biometric, the device identifier, and the session identifier.

7. The localized corroborator system of claim 1, wherein receiving the message digest from the user device comprises receiving the message digest from the user device via a short range communications technology.

8. The localized corroborator system of claim 1, wherein receiving the message digest from the user device comprises receiving the message digest from the user device via a wireless telecommunications technology.

9. A computer-readable storage medium comprising computer-executable instructions that, when executed by a processor, cause the processor to perform operations comprising:
    receiving a proof initiation message from a user device, wherein the proof initiation message requests a location proof to be created for use by the user device to prove that a user associated with the user device was located at a location at a time;
    in response to receiving the proof initiation message from the user device,
        recording the time,
        generating a session identifier that uniquely identifies a communications session between the user device and a localized corroborator system, and
        sending the session identifier to the user device;
    receiving the session identifier and a message digest from the user device, wherein the message digest comprises a bitwise XOR of a user identifier and a location proof identifier generated by the user device using a cryptographic hash function, wherein the user identifier uniquely identifies the user associated with the user device, and the location proof identifier uniquely identifies the location proof to be created by the localized corroborator system;
    concatenating a corroborator identifier, the location, a time difference between the time and a current time, the session identifier, and the message digest to create a concatenated message, wherein the corroborator identifier uniquely identifies the localized corroborator system;
    signing the concatenated message using a private key to create the location proof; and
    sending the corroborator identifier and the location proof to the user device for use by the user device to prove that the user was located at the location at the time.

10. The computer-readable storage medium of claim 9, wherein the location proof identifier comprises a random number with a same number of bits as the user identifier.

11. The computer-readable storage medium of claim 9, wherein the user identifier is based, at least in part, upon a biometric of the user.

12. The computer-readable storage medium of claim 11, wherein the user identifier is generated by the user device based, at least in part, upon the biometric of the user, a device identifier that uniquely identifies the user device, and the session identifier that uniquely identifies the communications session between the user device and the localized corroborator system.

13. The computer-readable storage medium of claim 12, wherein the device identifier comprises a media access control address, an international mobile subscriber identity associated with a subscriber identity module installed in the user device, or an international mobile equipment identity.

14. The computer-readable storage medium of claim 12, wherein the user identifier comprises a hash of a concatenation of the biometric, the device identifier, and the session identifier.

15. The computer-readable storage medium of claim 9, wherein receiving the message digest from the user device comprises receiving the message digest from the user device via a short range communications technology.

16. The computer-readable storage medium of claim 9, wherein receiving the message digest from the user device comprises receiving the message digest from the user device via a wireless telecommunications technology.

17. A method comprising:
 receiving, by a localized corroborator system comprising a processor, a proof initiation message from a user device, wherein the proof initiation message requests a location proof to be created for use by the user device to prove that a user associated with the user device was located at a location at a time;
 in response to receiving the proof initiation message from the user device,
  recording, by the localized corroborator system, the time,
  generating, by the localized corroborator system, a session identifier that uniquely identifies a communications session between the user device and the localized corroborator system, and
  sending, by the localized corroborator system, the session identifier to the user device;
 receiving, by the localized corroborator system, the session identifier and a message digest from the user device, wherein the message digest comprises a bitwise XOR of a user identifier and a location proof identifier generated by the user device using a cryptographic hash function, wherein the user identifier uniquely identifies the user associated with the user device, and the location proof identifier uniquely identifies the location proof to be created by the localized corroborator system;
 concatenating, by the localized corroborator system, a corroborator identifier, the location, a time difference between the time and a current time, and the message digest to create a concatenated message, wherein the corroborator identifier uniquely identifies the localized corroborator system;
 signing, by the localized corroborator system, the concatenated message using a private key to create the location proof; and
 sending, by the localized corroborator system, the corroborator identifier and the location proof to the user device for use by the user device to prove that the user was located at the location at the time.

18. The method of claim 17, wherein:
 the user identifier is generated by the user device based, at least in part, upon a biometric of the user, a device identifier that uniquely identifies the user device, and the session identifier that uniquely identifies the communications session between the user device and the localized corroborator system; and
 the time is taken at a beginning of the communications session and the current time is taken at a creation of the location proof.

19. The method of claim 18, wherein the user identifier comprises a hash of a concatenation of the biometric, the device identifier, and the session identifier.

20. The method of claim 17, wherein receiving the message digest from the user device comprises receiving the message digest from the user device via a short range communications technology or a wireless telecommunications technology.

* * * * *